US011798088B1

(12) United States Patent
Loo et al.

(10) Patent No.: US 11,798,088 B1
(45) Date of Patent: *Oct. 24, 2023

(54) OPTIMIZED INVENTORY ANALYSIS FOR INSURANCE PURPOSES

(71) Applicant: Allstate Insurance Company, Northbrook, IL (US)

(72) Inventors: William Loo, Arlington Heights, IL (US); Stephen Hughes, Belfast (GB); James Gillespie, Belfast (GB); Jennifer A. Brandmaier, Chicago, IL (US); Daniel Koza, Hinsdale, IL (US)

(73) Assignee: Allstate Insurance Company, Northbrook, IL (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/251,420

(22) Filed: Jan. 18, 2019

Related U.S. Application Data

(60) Continuation of application No. 14/032,709, filed on Sep. 20, 2013 (U.S. filing date under 35 U.S.C. 384), and having an international filing date of Mar. 10, 2017, now Pat. No. 10,223,750, which is a division of application No. 13/608,756, filed on Sep. 10, 2012, now abandoned.

(51) Int. Cl.
*G06Q 40/08* (2012.01)

(52) U.S. Cl.
CPC .................................... *G06Q 40/08* (2013.01)

(58) Field of Classification Search
CPC ...................................................... G06Q 40/08
See application file for complete search history.

(56) References Cited

U.S. PATENT DOCUMENTS

| 5,504,674 A | 4/1996 | Chen et al. |
| 5,655,085 A | 8/1997 | Ryan et al. |
| 5,697,001 A | 12/1997 | Ring et al. |

(Continued)

FOREIGN PATENT DOCUMENTS

| CA | 2303724 A1 | 9/2001 |
| EP | 1220131 A2 * | 7/2002 |

(Continued)

OTHER PUBLICATIONS

Sep. 30, 2015 (US) Non Final Office Action - U.S. Appl. No. 13/608,752.
Sep. 28, 2018 - (US) Non-Final Office Action - U.S. Appl. No. 13/608,752 (006591.00374).

(Continued)

*Primary Examiner* — Eric T Wong
(74) *Attorney, Agent, or Firm* — Dinsmore & Shohl LLP

(57) ABSTRACT

Systems and methods may provide for generating, maintaining, and using an inventory for insurance purposes. An optimized inventory analysis server may use a demographic classification for a given user along with data related to items owned by other users to determine one or more items for recommendation to the given user. Details associated with existing insurance coverage levels may also be used to recommend new insurance products to the user. In addition, the optimized inventory analysis server may determine a depreciated value of each item within an inventory. These values may be used to assess loss and settle an insurance claim for damage to one or more of the items in the inventory. Finally, the optimized inventory analysis server may recommend incentives on products/services sold by third party entities and may further recommend incentives on insurance products for insuring items purchased by a given user.

18 Claims, 12 Drawing Sheets

(56) References Cited

U.S. PATENT DOCUMENTS

| | | | |
|---|---|---|---|
| 6,611,807 | B1 | 8/2003 | Bernheim et al. |
| 6,678,685 | B2 | 1/2004 | McGill et al. |
| 6,829,584 | B2 | 12/2004 | Loveland |
| 6,851,611 | B1 | 2/2005 | Shaw-Sinclair |
| 6,904,410 | B1 | 6/2005 | Weiss et al. |
| 7,184,975 | B2 | 2/2007 | Ikeda |
| 7,343,310 | B1 | 3/2008 | Stender |
| 7,424,473 | B2 | 9/2008 | Orton, III et al. |
| 7,551,849 | B1 | 6/2009 | Abad |
| 7,568,200 | B2 | 7/2009 | Weiss |
| 7,765,118 | B1* | 7/2010 | Bohanek ............ G06Q 30/06 705/4 |
| 7,801,750 | B1 | 9/2010 | Wallach et al. |
| 7,809,587 | B2 | 10/2010 | Dorai et al. |
| 7,899,823 | B1* | 3/2011 | Trandal et al. ..... G06Q 10/087 707/736 |
| 7,941,330 | B1 | 5/2011 | Buentello et al. |
| 7,953,615 | B2 | 5/2011 | Aquila et al. |
| 8,041,636 | B1 | 10/2011 | Hunter et al. |
| 8,095,391 | B2 | 1/2012 | Obora et al. |
| 8,140,421 | B1 | 3/2012 | Humphries et al. |
| 8,185,463 | B1 | 5/2012 | Ball |
| 8,219,558 | B1 | 7/2012 | Trandal et al. |
| 8,266,017 | B1 | 9/2012 | Dearlove et al. |
| 8,655,683 | B2 | 2/2014 | Grundel et al. |
| 8,712,893 | B1 | 4/2014 | Brandmaier et al. |
| 8,756,085 | B1 | 6/2014 | Plummer et al. |
| 8,977,033 | B1 | 3/2015 | Maurer et al. |
| 9,002,719 | B2 | 4/2015 | Tofte et al. |
| 9,082,015 | B2 | 7/2015 | Christopulos et al. |
| 9,129,276 | B1 | 9/2015 | Fasoli et al. |
| 9,317,753 | B2 | 4/2016 | Saptharishi et al. |
| 9,519,734 | B2 | 12/2016 | Randolph |
| 9,605,704 | B1 | 3/2017 | Humphries et al. |
| 9,633,146 | B2 | 4/2017 | Plummer et al. |
| 9,672,567 | B2 | 6/2017 | Thomas et al. |
| 9,723,251 | B2 | 8/2017 | Slotky |
| 9,841,311 | B2 | 12/2017 | McCloskey et al. |
| 9,846,915 | B2 | 12/2017 | Howe et al. |
| 10,223,750 | B1 | 3/2019 | Loo et al. |
| 10,706,321 | B1 | 7/2020 | Chen et al. |
| 10,832,332 | B1 | 11/2020 | Spader et al. |
| 2002/0002475 | A1 | 1/2002 | Freedman et al. |
| 2002/0035522 | A1 | 3/2002 | Pilcher |
| 2002/0116163 | A1* | 8/2002 | Loveland ........ G06Q 10/06313 703/13 |
| 2002/0143564 | A1 | 10/2002 | Webb et al. |
| 2002/0184107 | A1 | 12/2002 | Tsuda et al. |
| 2003/0061104 | A1 | 3/2003 | Thomson et al. |
| 2004/0153346 | A1 | 8/2004 | Grundel et al. |
| 2004/0204966 | A1 | 10/2004 | Duffey et al. |
| 2005/0027571 | A1 | 2/2005 | Gamarnik et al. |
| 2005/0060236 | A1 | 3/2005 | Iulo |
| 2005/0197907 | A1 | 9/2005 | Weiss |
| 2005/0267900 | A1 | 12/2005 | Ahmed et al. |
| 2006/0161462 | A1 | 7/2006 | Sharma |
| 2006/0178902 | A1 | 8/2006 | Vicars et al. |
| 2006/0253351 | A1* | 11/2006 | Keaney ................ G06Q 40/08 705/4 |
| 2006/0259380 | A1 | 11/2006 | Milstein et al. |
| 2006/0282304 | A1* | 12/2006 | Bedard et al. ..... G06Q 30/0204 705/7.29 |
| 2006/0282342 | A1 | 12/2006 | Chapman |
| 2006/0293928 | A1 | 12/2006 | Schumacher et al. |
| 2007/0011033 | A1 | 1/2007 | Atkinson et al. |
| 2007/0143123 | A1 | 6/2007 | Goldberg et al. |
| 2008/0065427 | A1* | 3/2008 | Helitzer et al. ........ G06F 19/00 705/4 |
| 2009/0024420 | A1 | 1/2009 | Winkler |
| 2009/0138560 | A1 | 5/2009 | Stahl |
| 2009/0164304 | A1 | 6/2009 | Otto et al. |
| 2009/0171813 | A1 | 7/2009 | Byrne et al. |
| 2009/0177499 | A1 | 7/2009 | Westerberg et al. |
| 2009/0187468 | A1 | 7/2009 | Krech |
| 2009/0265193 | A1 | 10/2009 | Collins et al. |
| 2009/0307017 | A1 | 12/2009 | Mahdessian |
| 2009/0319362 | A1 | 12/2009 | Dashnaw |
| 2009/0326989 | A1 | 12/2009 | Schmitt et al. |
| 2010/0076794 | A1 | 3/2010 | Seippel |
| 2010/0103241 | A1* | 4/2010 | Linaker ................ H04W 24/00 348/14.02 |
| 2010/0131308 | A1 | 5/2010 | Collopy et al. |
| 2010/0241463 | A1 | 9/2010 | Corben et al. |
| 2010/0312584 | A1 | 12/2010 | Bradshaw et al. |
| 2011/0057789 | A1 | 3/2011 | Cai et al. |
| 2011/0161117 | A1* | 6/2011 | Busque et al. ...... G06F 19/3418 705/4 |
| 2011/0218875 | A1 | 9/2011 | Scruton et al. |
| 2011/0238451 | A1 | 9/2011 | Bazzani et al. |
| 2011/0288891 | A1 | 11/2011 | Zaid et al. |
| 2011/0314038 | A1 | 12/2011 | Pacella |
| 2011/0320222 | A1 | 12/2011 | Fini et al. |
| 2011/0320322 | A1 | 12/2011 | Roslak et al. |
| 2012/0016695 | A1 | 1/2012 | Bernard et al. |
| 2012/0036033 | A1 | 2/2012 | Seergy et al. |
| 2012/0042253 | A1 | 2/2012 | Priyadarshan et al. |
| 2012/0047082 | A1 | 2/2012 | Bodrozic |
| 2012/0095783 | A1 | 4/2012 | Buentello et al. |
| 2012/0310675 | A1 | 12/2012 | Binder |
| 2012/0323609 | A1* | 12/2012 | Fini ..................... G06Q 10/10 705/4 |
| 2013/0013344 | A1 | 1/2013 | Ernstberger et al. |
| 2013/0185100 | A1 | 7/2013 | Allu |
| 2013/0290033 | A1 | 10/2013 | Reeser et al. |
| 2013/0317860 | A1 | 11/2013 | Schumann, Jr. |
| 2014/0067430 | A1 | 3/2014 | Dardick et al. |
| 2014/0100889 | A1 | 4/2014 | Tofte et al. |
| 2014/0180725 | A1 | 6/2014 | Ton-That et al. |
| 2014/0188522 | A1 | 7/2014 | Fini |
| 2015/0025915 | A1 | 1/2015 | Lekas |
| 2015/0228028 | A1 | 8/2015 | Friedman |
| 2015/0332407 | A1 | 11/2015 | Wilson, II et al. |
| 2016/0171622 | A1 | 6/2016 | Perkins et al. |
| 2016/0284084 | A1 | 9/2016 | Gurcan et al. |
| 2016/0335727 | A1 | 11/2016 | Jimenez |
| 2017/0148101 | A1 | 5/2017 | Franke et al. |
| 2017/0221110 | A1 | 8/2017 | Sullivan et al. |
| 2017/0270650 | A1 | 9/2017 | Howe et al. |
| 2017/0323319 | A1 | 11/2017 | Rattner et al. |
| 2017/0330207 | A1 | 11/2017 | Labrie et al. |
| 2018/0260793 | A1 | 9/2018 | Li et al. |
| 2019/0108396 | A1 | 4/2019 | Dal Mutto et al. |

FOREIGN PATENT DOCUMENTS

| | | | |
|---|---|---|---|
| WO | 2006076566 | A1 | 7/2006 |
| WO | 2006122343 | A1 | 11/2006 |
| WO | 2013144772 | A1 | 10/2013 |
| WO | 2017176304 | A1 | 10/2017 |
| WO | 2018055340 | A1 | 3/2018 |

OTHER PUBLICATIONS

Sep. 28, 2016 - (US) Final Office Action - U.S. Appl. No. 14/065,006.

Sep. 18, 2017 - (US) Final Office Action - U.S. Appl. No. 13/608,752.

Sep. 17, 2020 - (US) Non-Final Office Action - U.S. Appl. No. 13/608,760 (006591.00376).

Oct. 18, 2018 - (US) Notice of Allowance - U.S. Appl. No. 14/032,709 (6591.678).

Oct. 15, 2013 (US) Non-Final Office Action - U.S. Appl. No. 13/608,752 (006591.00374).

Oct. 7, 2014 (US) Non-Final Office Action - U.S. Appl. No. 13/608,760.

Oct. 5, 2015 (US) Final Office Action - U.S. Appl. No. 13/608,765.

Nov. 27, 2015 - (US) Non Final Office Action - U.S. Appl. No. 14/065,006.

Nov. 12, 2013 (US) Non-Final Office Action - U.S. Appl. No. 13/608,765 (006591.00377).

Nov. 2, 2015 (US) Non-Final Office Action - U.S. Appl. No. 13/608,760.

May 26, 2015, (US) Final Office Action - U.S. Appl. No. 14/032,709 (006591.00678).

(56) References Cited

OTHER PUBLICATIONS

May 22, 2020 - (US) Notice of Allowance - U.S. Appl. No. 13/608,752 (6591.374).
May 20, 2015 (US) Non-Final Office Action - U.S. Appl. No. 13/608,765.
May 17, 2021 - (US) Non-Final Office Action - U.S. Appl. No. 16/662,934 (006591.02290).
Mar. 31, 2014 (US) Final Office Action - U.S. Appl. No. 13/608,752 (006591.00374).
Mar. 26, 2018 - (US) Non-Final Office Action - U.S. Appl. No. 13/608,760 (006591.00376).
Mar. 22, 2019 - (US) Final Office Action - U.S. Appl. No. 13/608,752 (006591.00374).
Mar. 7, 2017 - (US) Non-Final Office Action - U.S. Appl. No. 13/608,752.
Mar. 4, 2021 - (US) Notice of Allowance - U.S. Appl. No. 15/971,294 (006591.01685).
Karoon Rashedi Nia et al.; "Building Damage Assessment Using Deep Learning and Ground-Level Image Data"; https://www.cs.sfu.ca/~mor/research/papers/rashedi-nia-crv2017.pdf; website visited May 4, 2018, pages 1-8.
Jun. 10, 2016 - (US) Office Action - U.S. Appl. No. 14/065,006.
Jun. 4, 2021 - (US) Notice of Allowance - U.S. Appl. No. 15/971,294 (006591.01685).
Jul. 21, 2017 (US) Non-Final Office Action - U.S. Appl. No. 14/065,006.
Jul. 21, 2016 - (US) Office Action - U.S. Appl. No. 13/608,752.
Jul. 5, 2017 - (US) Final Office Action - U.S. Appl. No. 13/608,760.
Jul. 1, 2019 - (US) Notice of Allowance - U.S. Appl. No. 14/065,006 (006591.00701).
Jan. 14, 2014 (US) Final Office Action - U.S. Appl. No. 13/608,760 (006591.00376).
Jan. 7, 2021 - (US) Non-Final Office Action - U.S. Appl. No. 16/131,320 (006591.01767).
https://www.pantoninc.com/insurance.html; website visited May 4, 2018, pages 1-5.
https://www.accurence.com/carriers; website visited May 4, 2018, pages 1-6.
Homeowners Insurance - Insure Your Home with State Farm; Mar. 6, 2012; https://www.statefarm.com/insurance/homeowners/homeowners.asp.
Home Inventory Software Review 2012 Asset Inventory Management Software Home Inventory...; Mar. 6, 2012; home-inventory-software-review.toptenreviews.com.
Franklin Zhao et al. "Deep Learning based Structural Damage Detection"; https://github_com/QinganZhao/Deep-Learning-based-Structural-Damage-Detection; Jun. 2017, pages 1-8.
Feb. 28, 2014 (US) Final Office Action - U.S. Appl. No. 13/608,765 (006591.00377).
Feb. 19, 2021 - (US) Final Office Action - U.S. Appl. No. 13/608,760 (006591.00376).
Feb. 9, 2017 - (US) Office Action - U.S. Appl. No. 14/032,709.
Dec. 21, 2018 - (US) Non-Final Office Action - U.S. Appl. No. 14/065,006 (006591.00701).
Dec. 16, 2014 (US) Non-Final Office Action - U.S. Appl. No. 14/032,709 (006791.00678).
Dec. 11, 2020 - (US) Non-Final Office Action - U.S. Appl. No. 15/971,294 (006591.01685).
Dec. 5, 2017 - (US) Final Office Action - U.S. Appl. No. 14/065,006 (006591.00701).
Dec. 1, 2016 - (US) Non-Final Office Action - U.S. Appl. No. 13/608,760.
Daniel Keir "What role is image recognition technology poised to play for insurance?"; Hartford Insurtech Hub; https://hartfordinsurtechhub.com/role-image-recognition-technology-poised-play-insurance/; pages 1-4; Mar. 9, 2018.
BoomerangIt: World's leading Lost and Found Service, asset Protection, Asset Tracking, Luggage; Mar. 6, 2012; https://www.boomerangit.com.
Aug. 29, 2013 (US) Non-Final Office Action - U.S.Appl. No. 13/608,760 (006591.00376).
Aug. 24, 2016 - (US) Office Action - U.S. Appl. No. 14/032,709.
Aug. 8, 2017 - (US) Final Office Action - U.S. Appl. No. 14/032,709.
Aug. 1, 2016 - (US) Final Office Action - U.S. Appl. No. 13/608,760.
Apr. 18, 2016 - (US) Non Final Office Action - U.S. Appl. No. 14/032,709 (006591.00678).
Apr. 4, 2018 - (US) Non-Final Office Action - U.S. Appl. No. 14/032,709 (006591.00678).
Allstate Digital Locker; https://www.allstate.com/mobile/digital-locker.aspx; site last visited Jul. 29, 2015.
Adrian Rosebrock "Measuring size of objects in an image with OpenCV", pyimagesearch, https://www.pyimagesearch.com/2016/03/28/measuring-size-of-objects-in-an-image-with-opencv/, pages 1-72, Mar. 28, 2016.
"An Intro to Computer Vision and It's Impact on Insurance Claims and Analytics", Oct. 5, 2017, Jul. 1, 2016, Hemi Ventures; medium.com, 6 pages (Year:2016).
"Spotlight: The Rise of the Smart Phone", by Pei Zheng and Lionel M. Ni, IEEE Distributed Systems Online 1541-4922, Copyright 2006, Published by the IEEE Computer Society Vol. 7, No. 3; Mar. 2006. (Year: 2006).
'Will Social Media Change the Insurance Industry?"; Seeking Alpha; Mar. 06, 2012; seekingalpha.com/article/255962-will-social-media-change-the-insurance-industry.
'The Spex Field App - Features"; Spex; https://spexreport.com/features/; pages 1-6, website visited Sep. 14, 2018.
'Protect Yourself by Conducting a Home Inventory"; 2010; David Machost Garrett Insurance.
'Mobile Phone Insurance"; Mobile haggling Accessibility; 2008; (http://www.moneysavingexpert.com/accessibility).
'Mac App Store is the simplest way to find and download for your MAC"; Mar. 6, 2012; itunes.apple.com/us/app/home-inventory/id413564952?mt=12.
'Know Your Stuff Mobile Apps"; https://www.knowyourstuff.org/iii/viewOnIyNoLogin.html?page=front_iphone site; last visited Aug. 18, 2015.
'Know Your Stuff® - Home Inventory"; Mar. 6, 2012; https://www.knowyourstuff.org/iii/login.html.
'How Does It Work?" Record It Home & Business Services; 2011; https://www.RecordItHBS.com.
'HOVER Apps for Insurance Adjusters" Hover https://hover.to/apps-insurance-adjusters/; pages 1-5, website visited Sep. 14, 2018.
'Household and Personal Property Inventory Book", College of Agricultural, Consumer and Environmental Sciences; 1997; pgs 1-61.
'Home Manager Benefits", Home Inventory Software; Kaizen Software Solutions; Mar. 6, 2012; https://www.kzsoftware.com/products/home-inventory-software/.
'Grayscale"; Wikipedia https://en.wikipedia.org/wiki/Grayscale#Converting_color_to_grayscale website visited May 4, 2018, pages 1-6.
'Estimate Your Home Value to Match Coverage Limits"; Safeco Insurance, A Liberty Mutual Company; Mar. 15, 2012; http://www.safeco.com/insurance-101/consumer-tips/your-home/insurance-to-value.
'Creating A Home Inventory", State Farm Insurance; Mar. 6, 2012; learningcenter.statefarm.com/residence/insurance-2/creating-a-home-inventory/.
'Create a Home Inventory for Insurance", houselogic; Mar. 6, 2012; http://www.houselogic.com/home-advice/home-inventories/home-inventory-for-insurance/.
'GIO It's a trust thing"; Home and Contents Insurance; Home Contents Insurance; GIO; Mar. 6, 2012; https://www.gio.com.au/home-insurance/home-contents-insurance.
Home and Renters Insurance; Country Financial; Mar. 6, 2012; https://www.countryfinancial.com/SiteController?url=/InsuranceInvestments/homeInsurance.

(56) References Cited

OTHER PUBLICATIONS

Kyle Switch Plates; https://www.kyleswitchplates.com/switch-plate-size-reference-information/; website visited May 4, 2018, pages 1-13.

MyHome Pro: Home Inventory - Apps on Android Market; Mar. 6, 2012; https://marekt.android.com/details?id=com.accesslane.myhome.

\* cited by examiner

OPTIMIZED INVENTORY ANALYSIS FOR INSURANCE PURPOSES

CROSS REFERENCE TO RELATED-APPLICATIONS

This application is a continuation of co-pending U.S. Application Serial No. 14/032,709, filed Sep. 20, 2013, which is a divisional application of Application Serial No. 13/608,765, filed Sep. 10, 2012, which is herein incorporated by reference in their entirety. This application is related to U.S. Application Serial No. 13/608,752, filed Sep. 10, 2012 and U.S. Application Serial No. 13/608,760, filed Sep. 10, 2012.

TECHNICAL FIELD

The present disclosure relates to systems and methods for generating, maintaining, and using an inventory for insurance purposes.

BACKGROUND

Conventional software applications for generating an inventory of items associated with property such as a home, office, business, etc. are little more than non-intelligent databases for storing each item input by a user. In addition, conventional inventory applications are stand-alone systems that are not configured to interact with external systems to better leverage the information included in the inventory.

Therefore, there is a need for optimized systems and methods for generating an inventory and leveraging the information included within the inventory.

SUMMARY

The following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the disclosure involve optimized systems and methods for generating, maintaining, and using documentation of an inventory of items associated with an entity such as a home, office, vehicle, and other types of property.

In another aspect of the disclosure, an optimized inventory analysis server may interface with external systems and may generate an inventory configured for various purposes, including insurance analysis. In particular, the optimized inventory analysis server may identify users associated with an entity such as an insurance company and may generate a profile associated with the users. In addition, the optimized inventory analysis server may store information related to ownership of various inventory items. Using the inventory information associated with each user profile, the optimized inventory analysis server may also recommend items that each user may want to own or may already own but has forgotten to add to the inventory. In another aspect, the optimized inventory analysis server may determine a depreciated price for items within an inventory.

In another aspect, an optimized inventory analysis server may calculate loss associated with an insurance claim by interfacing with a database storing items within an inventory. The server may also allow users to provide more information to recalculate the loss and generate a finalized settlement.

In another aspect, an optimized inventory analysis server may manage the storage of information related to what a user owns, insurance coverage for items owned by the user, and the value of items owned and insured by the user. Based on an analysis of this information, the optimized inventory analysis server may determine if each item owned/stored is insured at all (e.g., via an item-by-item insurance policy) and/or adequately insured. In another aspect, the optimized inventory analysis server may determine if there are any additional and/or alternative insurance products from which users may benefit.

In other aspects, an optimized inventory analysis server may recommend incentives for purchasing items sold by third party entities. The optimized inventory analysis server may also offer incentives for purchasing insurance products for insuring items sold by third party entities.

Further aspects of the disclosure may be provided in a computer-readable medium having computer-executable instructions that, when executed, cause a computer, user terminal, or other apparatus to at least perform one or more of the processes described herein.

BRIEF DESCRIPTION OF THE DRAWINGS

All descriptions are exemplary and explanatory only and are not intended to restrict the disclosure, as claimed. The accompanying drawings, which are incorporated in and constitute a part of this specification, illustrate embodiments of the disclosure and, together with the description, serve to explain the principles of the disclosure. In the drawings:

DETAILED DESCRIPTION

In accordance with various aspects of the disclosure, methods, computer-readable media, and apparatuses are disclosed through which an inventory may be generated, maintained, and used for insurance purposes. In certain aspects, when an optimized inventory analysis server receives an inventory of all items associated with an entity (e.g., home, business, vehicle, etc.) from one or more computing devices (e.g., a desktop, mobile device, etc.), the optimized inventory analysis server may process the received inventory data to provide enhanced services to users (e.g., customers of an insurance company).

Embodiments of the disclosure may utilize various hardware components (e.g., processors, communication servers, memory devices, etc.) and related computer algorithms to generate an inventory of items and associated user profiles, to price the items within the inventory, to recommend items that users may not already own and may want to purchase in the future, to assess loss associated with the inventory items, to recommend additional/alternative insurance products from which users may benefit, to recommend incentives on items that users may want to purchase, to suggest items a user may already own and should add to the inventory, and to recommend incentives on insurance products for insuring items that users may want to purchase.

Figure 1:
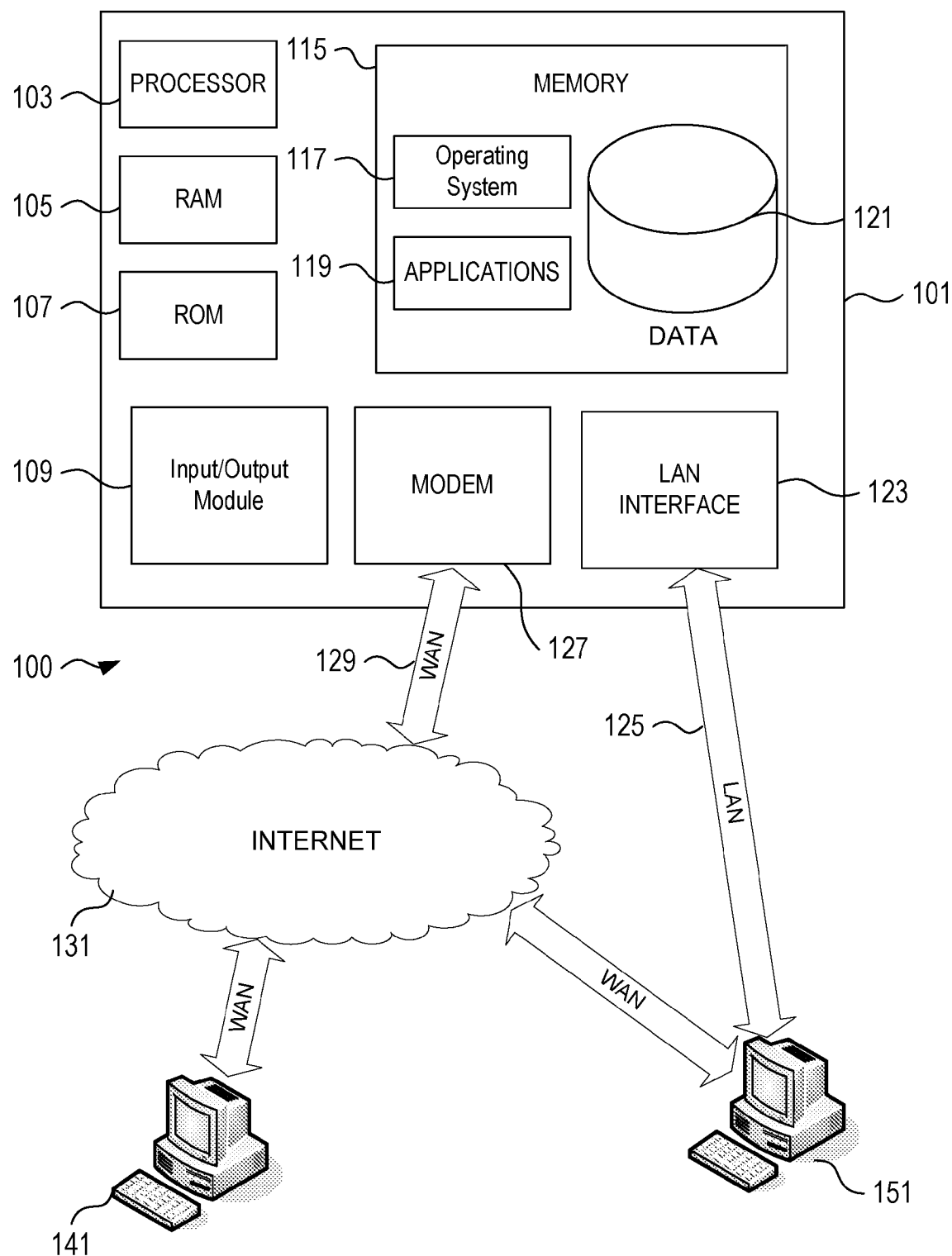
FIG. 1 shows an illustrative operating environment in which various aspects of the disclosure may be implemented.

FIG. 1 illustrates a block diagram of an optimized inventory analysis server 101 (e.g., a computer server) in communication system 100 that may be used according to an illustrative embodiment of the disclosure. The server 101 may have a processor 103 for controlling overall operation of the optimized inventory analysis server 101 and its associated components, including RAM 105, ROM 107, input/output module 109, and memory 115.

I/O 109 may include a microphone, keypad, touch screen, camera, and/or stylus through which a user of optimized inventory analysis server 101 may provide input, and may also include one or more of a speaker for providing audio output and a video display device for providing textual, audiovisual, and/or graphical output. Software may be stored within memory 115 to provide instructions to processor 103 for enabling device 101 to perform various functions. For example, memory 115 may store software used by the device 101, such as an operating system 117, application programs 119, and an associated database 121. Processor 103 and its associated components may allow the device 101 to run a series of computer-readable instructions to analyze inventory data and recommend items that users may want to purchase in the future. Processor 103 may also calculate the value of various items of an inventory for use in assessing loss associated with an insurance claim (e.g., via claims adjustment processes).

The server 101 may operate in a networked environment supporting connections to one or more remote computers, such as terminals 141 and 151. The terminals 141 and 151 may be personal computers or servers that include many or all of the elements described above relative to the server 101. Also, terminal 141 and/or 151 may be data stores for storing inventory data of insured items associated with one or more users. In yet other embodiments, terminals 141 and 151 may represent various external systems (e.g., authentication systems, etc.) that interface with server 101 to provide enhanced insurance services.

The network connections depicted in FIG. 1 include a local area network (LAN) 125 and a wide area network (WAN) 129, but may also include other networks. When used in a LAN networking environment, the server 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the optimized inventory analysis server 101 according to an illustrative embodiment of the disclosure may include computer executable instructions for invoking functionality related to calculating an appropriate payment for assessed damage associated with one or more items in an inventory.

Optimized inventory analysis server 101 and/or terminals 141 or 151 may also be mobile terminals including various other components, such as a battery, speaker, camera, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions being executed by a computer. The disclosure may also be practiced in distributed computing environments where tasks are performed by remote processing devices that are linked through a communications network. In a distributed computing environment, computer-executable instructions may be located in both local and remote computer storage media including non-transitory memory storage devices, such as a hard disk, random access memory (RAM), and read only memory (ROM).

Figure 2:
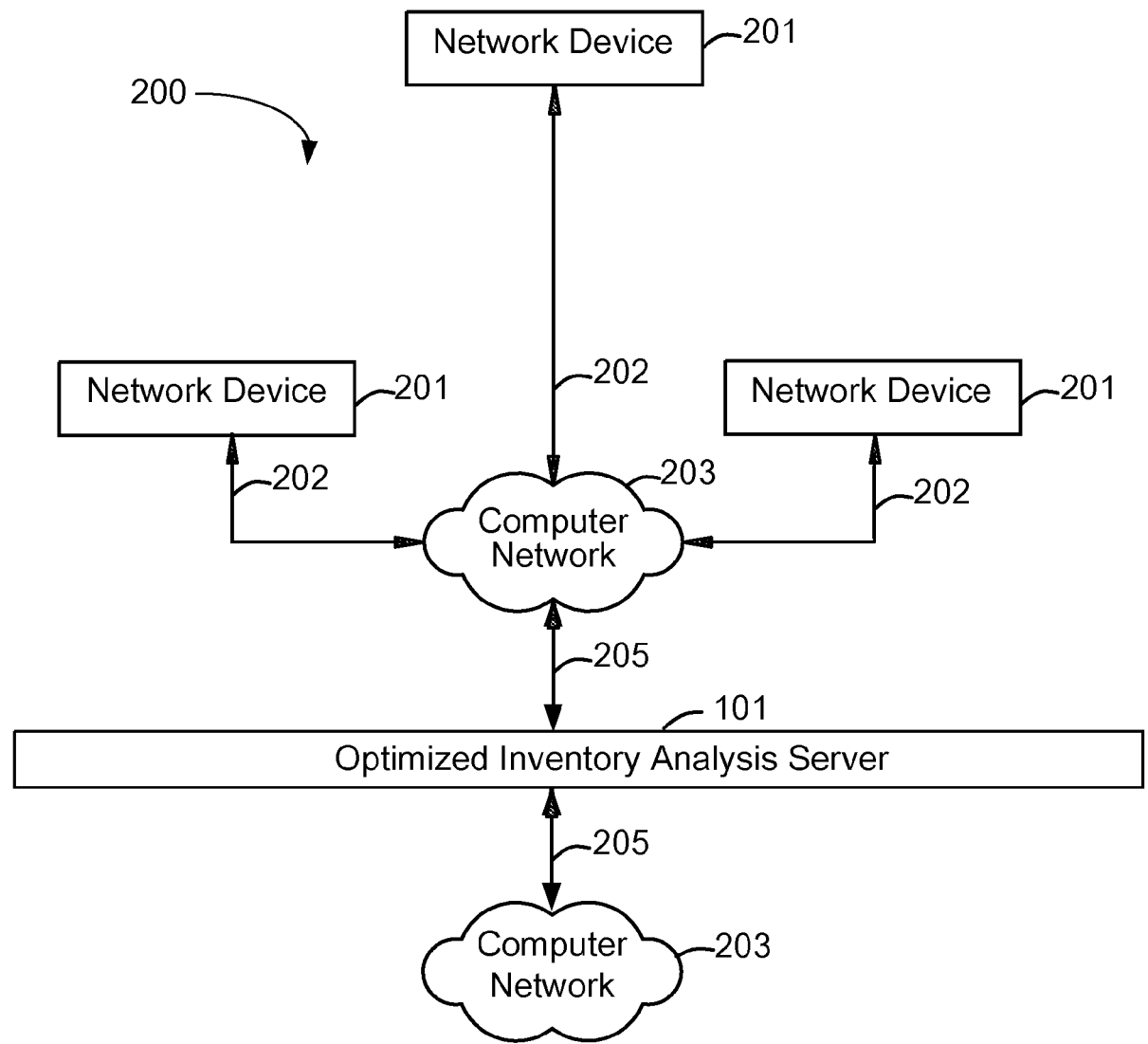
FIG. 2 shows a system of network devices and servers that may be used to implement the processes and functions of certain aspects of the present disclosure.

Referring to FIG. 2, a system 200 for implementing methods according to the present disclosure is shown. As illustrated, system 200 may include one or more network devices 201. Devices 201 may be local or remote, and are connected by one or more communications links 202 to computer network 203 that is linked via communications links 205 to optimized inventory analysis server 101. In certain embodiments, network devices 201 may run different algorithms used by server 101 for analyzing inventory data associated with an entity such as a home, business, vehicle, etc. or, in other embodiments, network devices 201 may be data stores for storing insured items that are part of an inventory. In yet other embodiments, network devices 201 may represent mobile user devices configured to transmit inventory data from a user premise to server 101. In further embodiments, network devices 201 may represent various sensors/processors (e.g., cameras, image processors, audio/video analyzers, etc.) that interface with server 101 for processing inventory data. In system 200, optimized inventory analysis server 101 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between network devices 201 and server 101, such as network links, dial-up links, wireless links, hard-wired links, etc.

The steps that follow in the Figures may be implemented by one or more of the components in FIGS. 1 and 2 and/or other components, including other computing devices.

In accordance with aspects of the disclosure, one or more users may attempt to access inventory information associated with an optimized inventory analysis server 101. Users may access this information through a variety of computing devices, including a personal computer, mobile device, tablet, etc. and through various communication platforms, including the Internet. A user may enter login credentials (e.g., username, password, etc.) into a user interface (e.g., a customized graphical user interface depending on the type of device a user is using to access server 101). Processor 103 may then process these credentials to authenticate the user.

Once a user has been authenticated, optimized inventory analysis server 101 may retrieve an associated user profile and inventory information related to the associated user profile. If a user does not have a user profile, optimized inventory analysis server 101 may request that the user create a new profile with new login credentials. In addition, server 101 may also allow for the creation of a profile for a group of users, such as a household, family, friends circle, etc. In this instance, server 101 may allow each member of the group to access and/or update inventory information related to the group.

Once a user profile has been retrieved and/or created, optimized inventory analysis server 101 may classify the user into one or more demographics (e.g., by gender, age, current location, ethnicity, religion, past location such as original hometown, length of association with an entity managing optimized inventory analysis server 101, income level, etc.). Optimized inventory analysis server 101 may classify the user based on information provided directly from the user and/or by accessing information from external databases (e.g., property records, tax forms, motor vehicle records, etc.).

The user may also upload any media representation (e.g., text, images, video, audio annotations, etc.) of physically-owned items associated with an entity such as a home, business, vehicle, and/or other types of property. Optimized inventory analysis server 101 may interface with the media capture functionality of various user devices, including mobile phones, personal computers, etc. In this aspect, optimized inventory analysis server 101 may also be configured to process information in a variety of formats to customize the user experience and cater to the preferences of each user transmitting the information. For instance, a user may use a communication module of a personal computer to transmit information (e.g., via formats such as Audio Video Interleave (AVI), Moving Picture Experts Group (MPEG), Waveform Audio File Format (WAV), Short Message Service (SMS), Hypertext Transfer Protocol (HTTP), Simple Mail Transfer Protocol (SMTP), File Transfer Protocol (FTP), etc.) related to each item found within a user's home to server 101. When new information is received, server 101 may be configured to access and store information in each type of media and may allow users to add additional items of an inventory using a preferred media type. In some aspects, server 101 may also interface directly or indirectly (e.g., through a personal computer) with other devices (e.g., cameras, microphones, etc.) at a user location for generating/updating/storing inventory information.

Inventory information may be stored in a database or other secure server (e.g., network device 201) either internal and/or external to an entity (e.g., an insurance company) managing optimized inventory analysis server 101. Information stored in the database may be accessible through various communication platforms (e.g., the Internet) to both the entity managing optimized inventory analysis server 101 and to other users (e.g., customers of the entity managing optimized inventory analysis server 101). In addition, the information may be compartmentalized so that the items associated with each user's inventory are stored separately in database 201.

In accordance with various aspects of disclosure, a user device (e.g., mobile phone, personal computer, tablet, etc.) may transmit inventory information to an interface (e.g., a graphical user interface for a tablet, mobile device, personal computer, etc.) of optimized inventory analysis server 101. The interface (e.g., I/O module 109) may then transmit the inventory information to a processor (e.g., processor 103) to coordinate storing of the inventory information in database 201. In some aspects, users may access inventory information stored in database 201 via links displayed on an Internet website.

In other aspects, processor 103 may also associate various types of metadata with each inventory in database 201. For instance, processor 103 may cause storage of details (e.g., address of a home or business, name of an owner, level of insurance coverage, etc.) of each inventory. In some aspects, server 101 may accomplish this association by linking the information stored in a predetermined user profile with a corresponding inventory. In additional aspects, processor 103 may also include metadata that describes each item in an inventory. For instance, if an inventory corresponds to items located within a home, processor 103 may include details about the room where each item is found, date that each item was purchased, purchase price of each item, prior damage associated with each item, and the like. Once all of the inventory information and associated metadata have been properly stored, processor 103 may use the information in database 201 to retrieve relevant inventory information for recommending items that may be of interest to users and for processing insurance claims associated with each inventory (discussed further below).

In certain aspects of the disclosure, optimized inventory analysis server 101 may identify each item of an inventory received by I/O module 109. In this aspect, server 101 may process each received item to correctly identify the item and once identified, may determine/store additional details associated with the item (e.g., size, shape, value, etc.). For instance, if server 101 receives a photo of a personal computer located in the basement of a home, server 101 (or associated systems 201) may use image processing techniques (e.g., blur filters, grey-scaling, optical recognition, edge detection, comparison to similar items stored in database 201, etc.) to identify that what is depicted in the photo is in fact a personal computer of a particular model type. Once the personal computer has been identified, server 101 may further analyze the photo to determine any damage associated with the computer. In addition, if server 101 receives an audio/video file detailing each item located in each room of a home, server 101 may use speech/video processing techniques to determine the list of items included in the audio/video file. In other aspects, users may directly transmit information describing each item (e.g., an email/telephone call/SMS message stating the model/serial number of a computer, the size and condition of an expensive oriental rug, the size/artist/purchase history associated with a prized painting, etc.) to server 101.

Regardless of the way in which inventory information and associated details are generated (e.g., transmitted directly from a user associated with the inventory, generated through further analysis of image/audio/video/data files received by server 101, etc.), server 101 may store the information related to each item of an inventory and associated metadata in database 201 for further use.

Using the inventory data and the information in the user profile (e.g., demographic classification), server 101 may recommend items that are not currently included in the inventory associated with a given user and/or group of users (e.g., a household, etc.) and that may be of interest to the given user and/or group of users. The items recommended by server 101 may be items that are owned by users with characteristics similar to the user in question. For instance, server 101 may base its recommendation of one or more items on items that are owned by a majority of users within the same or similar demographic classification as the user in question (e.g., 80% of single males ages 25-30 own a personal computer).

Figure 3:
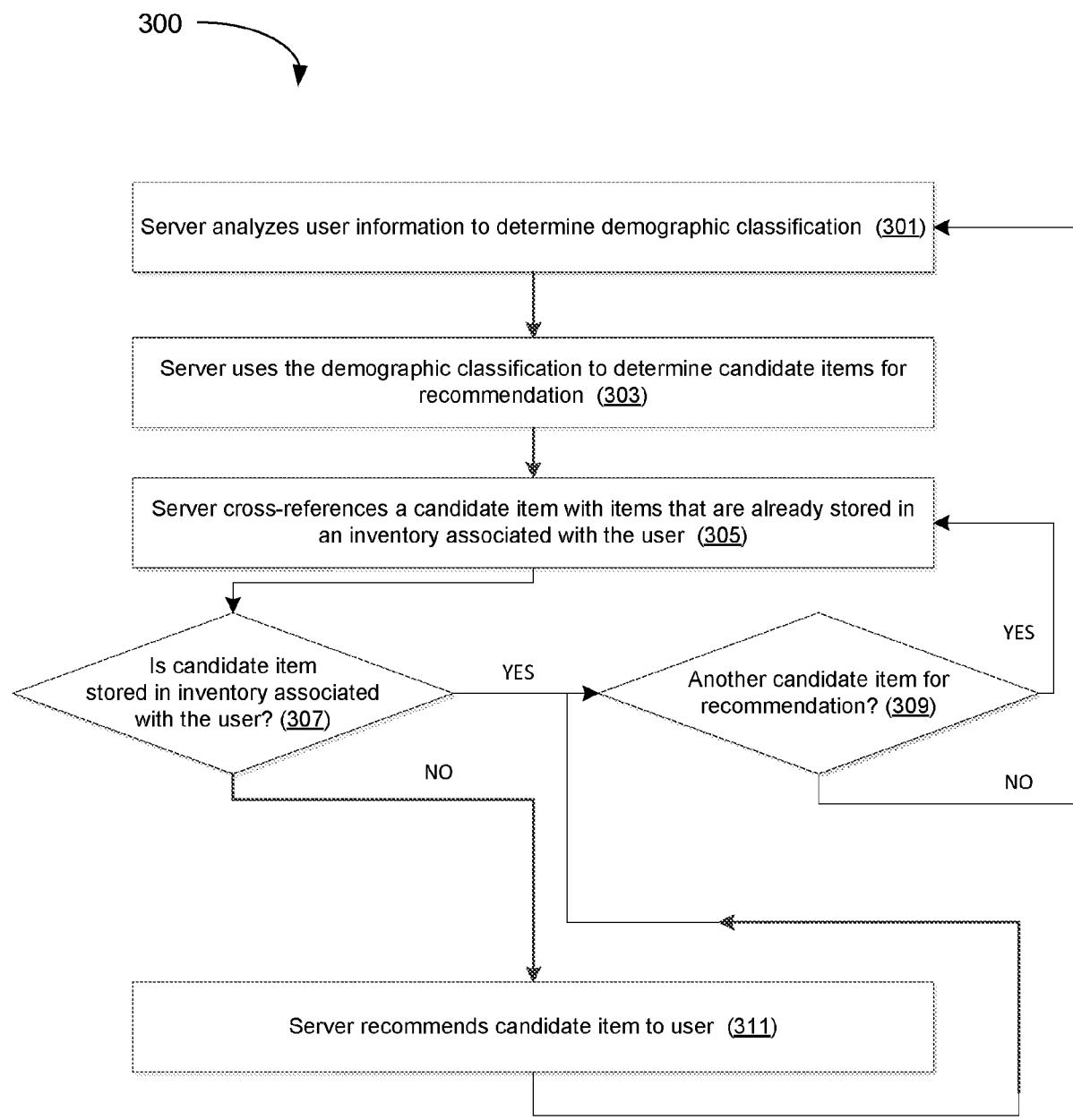
FIG. 3 shows a process flow for a predictive demographic item method in accordance with certain aspects of the present disclosure.

FIG. 3 shows a process flow for a predictive demographic item method in accordance with at least one aspect of the present disclosure. The process 300 may start out in step 301 where optimized inventory analysis server 101 may use user information related to a given user to determine a demographic classification. For instance, server 101 may use a classification related an age, gender, race, and/or income level of the given user.

Then, in step 303, optimized inventory analysis server 101 may use this classification to determine candidate items for recommendation. Server 101 may perform this function in a variety of ways. For instance, server 101 may access a database (e.g. database 201) storing information related to demographic classifications of all users associated with server 101 and the inventory items pertaining to these users. Server 101 may then process the information in database 201 to determine which items are owned/insured by a majority of users that fall into the same and/or similar demographic classification as a given user. In other embodiments, server 101 may process the information in database 201 to determine which items are owned/insured by at least one user that falls into the same and/or similar demographic classification as a given user. In yet other embodiments, server 101 may process the information in database 201 to determine which items are owned/insured by a predetermined percentage of users that fall into the same and/or similar demographic classification as a given user.

Once the candidate items for recommendation are determined, the process may move to step 305 where optimized inventory analysis server 101 may cross-reference a candidate item with items already stored in an inventory associated with a given user. The process may then move to step 307 where server 101 may determine if the candidate item is stored in an inventory associated with the user. If the candidate item is stored in an inventory associated with the user, optimized inventory analysis server 101 may skip the candidate item for recommendation by moving to decision step 309 where server 101 may determine if there is another candidate item for recommendation. If there is another candidate item for recommendation, the process may move back to step 305 where server 101 may cross-references the next candidate item with items that are already stored in an inventory associated with the user. If there are no additional candidate items for recommendation, the process may move back to step 301 where the process may start over.

If the candidate item evaluated in step 307 is not stored in an inventory associated with the user, the process may move to step 311 where optimized inventory analysis server 101 may recommend the candidate item to the user. Server 101 may recommend the candidate item to the user in a variety of ways, including via the Internet (e.g., a website displaying the recommended item to the user on a display screen associated with a user device, etc.), email, telephone, regular postal mail, SMS, etc. The process may then move back up to step 309 where server 101 may determine if there are other candidate items for recommendation to the user. If there are additional items, the process moves back up to step 305 and if there are no additional items, the process moves back up to step 301. In other embodiments, server 101 may cross-reference all candidate items on the list of candidate items before recommending any candidate item to a user.

Figure 4:
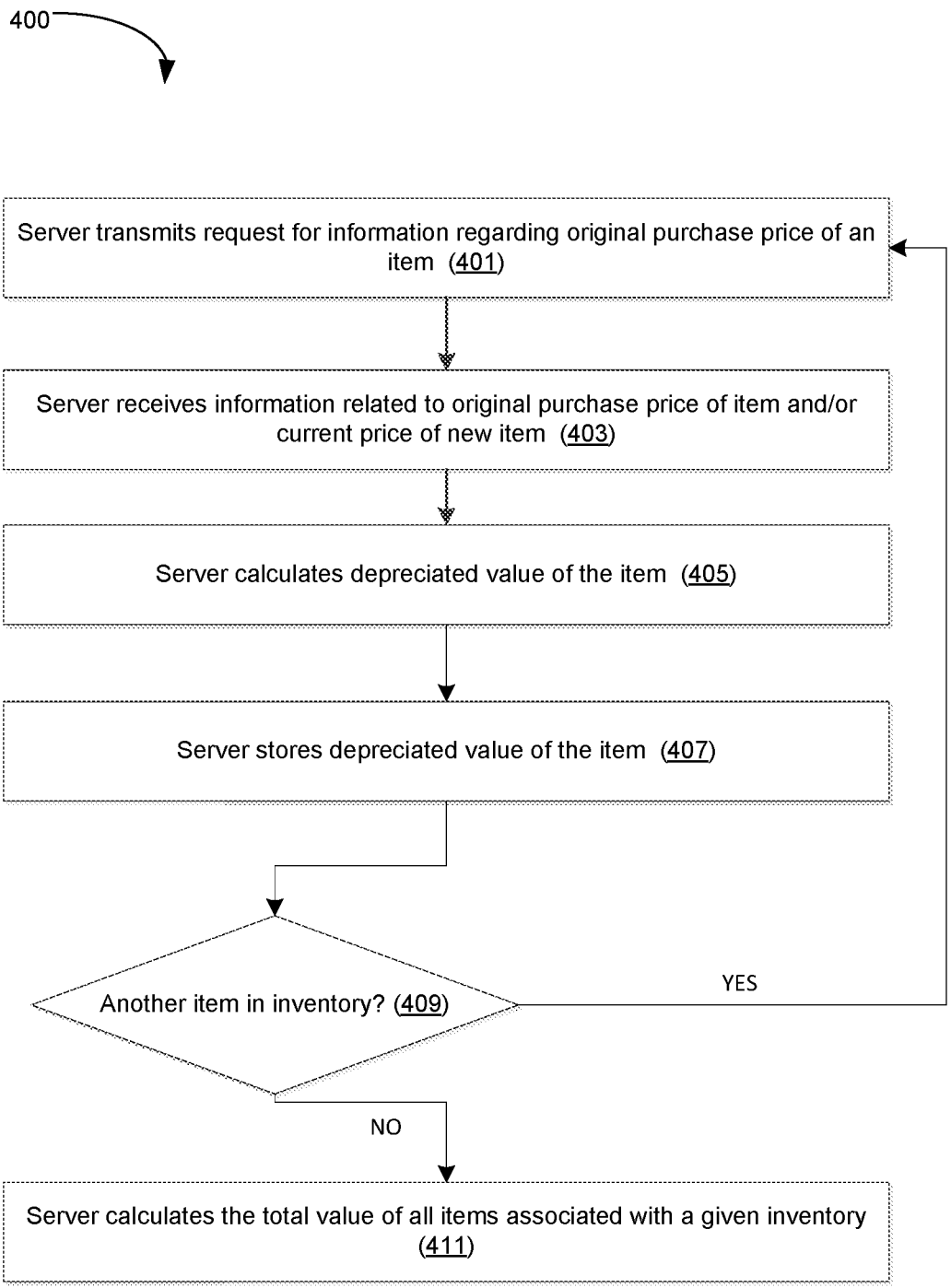
FIG. 4 shows a process flow for valuation of items stored as part of an inventory in accordance with certain aspects of the present disclosure.

FIG. 4 shows a process flow for valuation of items stored as part of an inventory in accordance with at least one aspect of the present disclosure. The process 400 may start out at step 401 where optimized inventory analysis server 101 may transmit a request for information regarding an original purchase price of an item associated with an inventory stored in database 201. In some embodiments, this request may be transmitted when server 101 receives information that a new item associated with a given inventory has been uploaded into database 201. This information may have been originally received by server 101 and stored in database 201 through a variety of mechanisms. For instance, server 101 may have received this information from a user that owns the item, or server 101 may have interfaced with external databases (e.g., online catalogs, websites, etc.) to determine this information.

The process may then move to step 403 where server 101 may receive the requested information related to the original purchase price of the item. If the requested information is not available, server 101 may calculate and/or otherwise determine the current price of the item. For instance, server 101 may calculate the current price of the item through a predefined formula that considers at least a portion of information known about the item. For example, if server 101 is able to retrieve information related to the model number and/or other product details of the item in question, server 101 may use this information to reference similar items within an external database. Server 101 may then use the price of the similar items to price the item in question and/or may adjust the price of the similar item based on any differences between the similar items and the item being priced.

Once the original purchase price and/or the current price of the item is determined, the process may move to step 405 where server 101 may calculate the depreciated value of the item based on age, prior damage, etc. For instance, if the original price of a flat panel television set in the living room of a home was $1000, the depreciated value of the item may now be $200, considering the age and any prior damage. After the depreciated value of the item is determined, the process may move to step 407 where server 101 may store the determined value of the item in datastore 201.

The process may then move to step 409 where server 101 may decide if there is another item that needs to be priced. If there is another item to be priced in the inventory, the process may move back to step 401. If there are no other items to be priced, the process may move to step 411 where server 101 may calculate the total value of all items associated with a given inventory.

Figure 5:
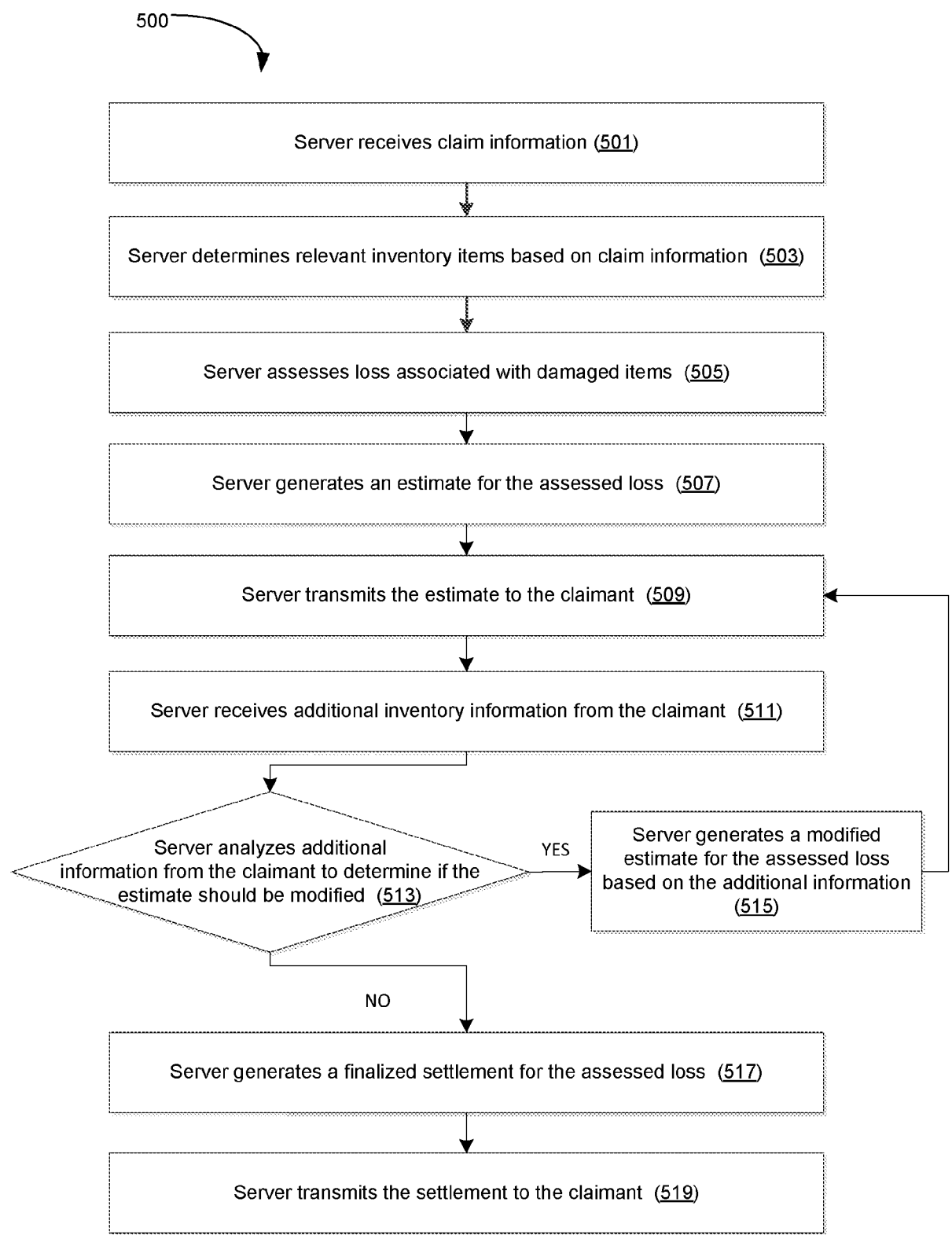
FIG. 5 shows a process flow for automatic loss valuation in accordance with certain aspects of the present disclosure.

FIG. 5 shows a process flow for automatic loss valuation in accordance with at least one aspect of the present disclosure. The process 500 may start out at step 501 where the optimized inventory analysis server 101 may receive information related to a given claim. This information may be received directly from a claimant and/or through additional systems/servers managed by the entity managing optimized inventory analysis server 101 (e.g., an insurance company).

The process may then move to step 503 where server 101 may access inventories of insured items associated with the claimant and may determine which items of a given inventory are relevant to the claim. For instance, if the claim relates to fire damage associated with a particular room of a home, server 101 may determine all of the insured items within that room of the home. To determine relevant inventory information, server 101 may access data stored in database 201.

The process may then move to step 505 where server 101 may assess loss associated with the damaged items. To assess loss, server 101 may also access pricing information calculated and stored by server 101 through processes such as those detailed in FIG. 4. Server 101 may also use other computer-implemented methods maintained by the entity managing server 101 to assess loss related to the claim.

Once loss has been assessed, the process may move to step 507 where server 101 may generate an estimate for the assessed loss. This estimate may reflect the inventory information stored in and retrieved from database 201 in step 503. The estimate may include an estimate of the assessed loss, the methodology by which server 101 arrived at the assessed loss, a list of insured items deemed to be relevant to the claim, insurance coverage levels for each insured item, and a proposed settlement amount for any assessed damage to insured items. Optimized inventory analysis server 101 may then transmit the estimate to the claimant in step 509.

Upon reviewing the estimate, the claimant may transmit additional information to server 101 in step 511. For instance, the claimant may determine that server 101 should consider additional information in generating an estimate. Additional information may represent additional inventory items not included in the estimate but considered relevant to the claim, perceived errors in the insurance coverage levels associated with each insured item, and any other disagreement and/or question in relation to the information included in the estimate.

Once new information is received, server 101 may analyze the additional information to determine if a modified estimate should be generated in step 513. If a modified estimate should be generated, the process may move to step 515 where server 101 may generate a modified estimate for the assessed loss. The process may then move back to step 509 where the modified estimate is transmitted to the claimant for further review. In some embodiments, steps 511-515 may be repeated any number of times until an agreement is reached with regard to a settlement. In other embodiments, steps 511-515 may be repeated up to a maximum number of times, after which the claims adjustment and settlement process may be transferred to a personal claims adjuster associated with the entity managing server 101. In certain aspects, steps 511-515 may be performed optionally (e.g., depending on whether the claimant has additional information to provide to server 101).

If a modified estimate is deemed unnecessary based on a review of the additional information provided by the claimant, the process may move to step 517 where server 101 may generate a settlement for the assessed loss. Once a finalized settlement is generated, optimized inventory analysis server 101 may transmit the settlement to the claimant in step 519. Aspects of the disclosure allow optimized inventory analysis server 101 to settle the claim in a variety of ways. For instance, the settlement may be transmitted as a check that is directly deposited into a bank account associated with the claimant. In other examples, the settlement may be transmitted via postal mail, email, etc. directly to the claimant.

In some aspects, server 101 may calculate the assessed loss and settlement in real-time when an insurance claim is first received by an entity managing server 101. The claim may relate to one or more items that are a part of an inventory associated with a claimant. In some embodiments, the claim submitted by the claimant may relate to a total disaster. It should also be noted that one or more of the process steps listed FIG. 5 may be performed by other devices/servers associated with the entity managing server 101. For instance, inventory information may be accessed from databases located in external networks, claim loss may be assessed via a claims system that is separate from optimized inventory analysis server 101, and communication with external systems/users may occur through front end communication modules that are associated with server 101.

Figure 6A:
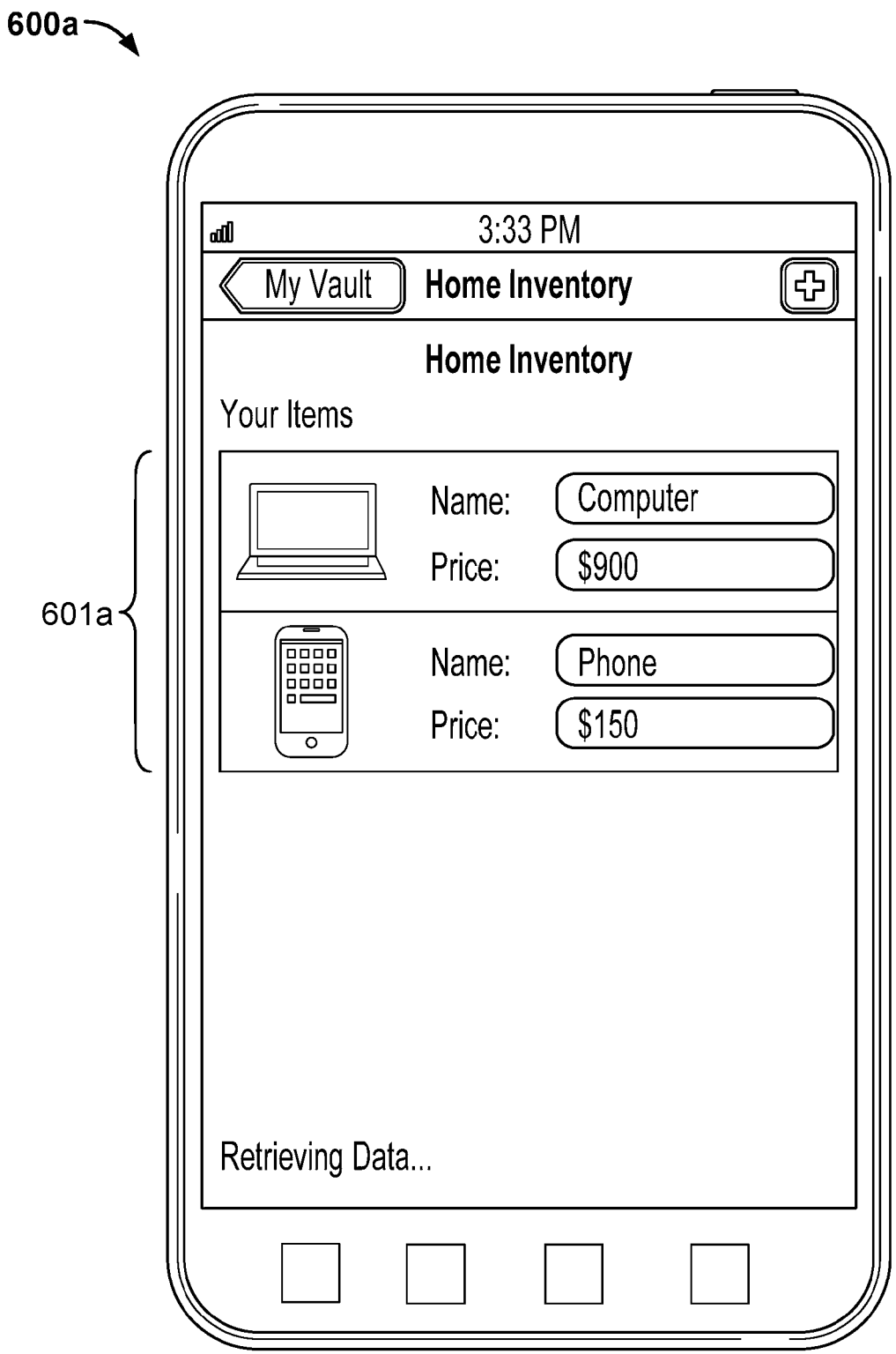
FIG. 6a shows an example display screen for displaying an inventory in accordance with certain aspects of the present disclosure.

FIG. 6a shows an example display screen 600a for displaying an inventory in accordance with at least one aspect of the present disclosure. Screen 600a may be displayed on any number of computing devices, including desktop computers and mobile devices such as mobile phones. In addition, screen 600a may be configured to allow users such as customers of an entity managing optimized inventory analysis server 101 (e.g., an insurance company) to view items that are a part one of more inventories. For instance, screen 600a may display a list 601a of items that belong to a home inventory associated with a given user and/or group of users. Although screen 600a depicts a list 601a of items that are a part of a home inventory, screen 600a may display an inventory associated with any number of other types of property, including vehicles, businesses, etc. It should also be noted that screen 600a may be displayed after a user has entered information (e.g., name of user associated with the inventory, address related to the inventory, etc.) identifying the inventory that should be displayed.

Figure 6B:
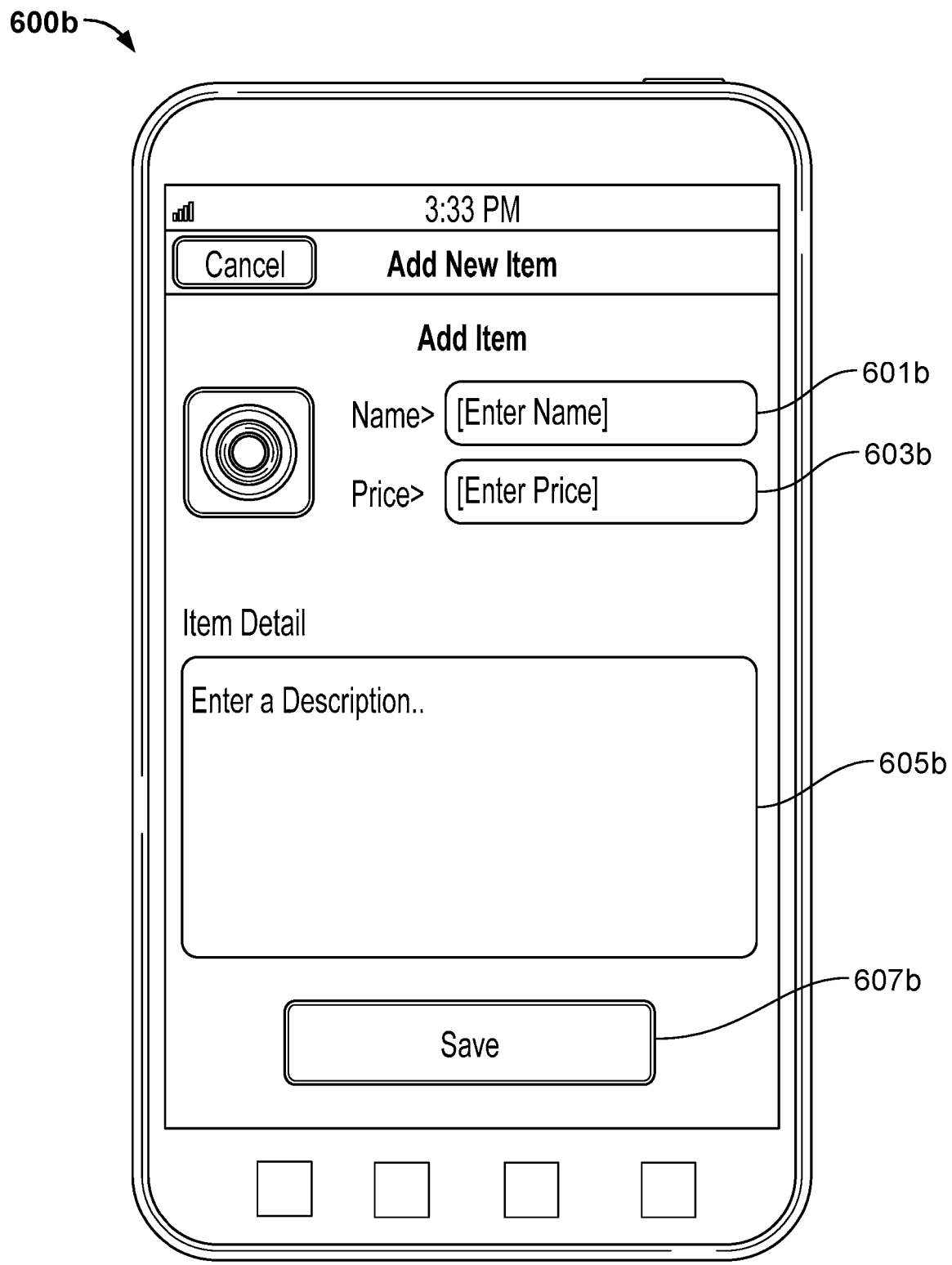
FIG. 6b shows an example display screen for allowing a user to add items to an inventory in accordance with certain aspects of the present disclosure.

FIG. 6b shows an example display screen 600b for allowing a user to add items to an inventory in accordance with at least one aspect of the present disclosure. Screen 600b may include various fields for identifying the item to be added, including a "name" field 601b for identifying the name of the item (e.g., personal computer, diamond ring, etc.) and a "price" field 603b for entering in a purchase price of the item. In some aspects, optimized inventory analysis server 101 may automatically calculate a purchase price of an item based on other known details about the item (e.g., by scanning a barcode associated with the item and searching for the item online for a manufacturer's suggested retail price (MSRP), by cross-referencing the item with similar (or the same) items owned by other users who have already entered a purchase of the item, etc.) A user may also enter more information about the item in an "item detail" field 605b. For instance, the "item detail" field 605b may include details about the age of the item, prior damage associated with the item, special features associated with the item, etc. Once a user has entered information into one or more fields 601b-605b of screen 600b, the user may save the information by touching the "save" button 607b. It should also be noted that screen 600b may be displayed after a user has entered information (e.g., name of user associated with the inventory, address related to the inventory, etc.) identifying the inventory to which items are being added.

Figure 6C:
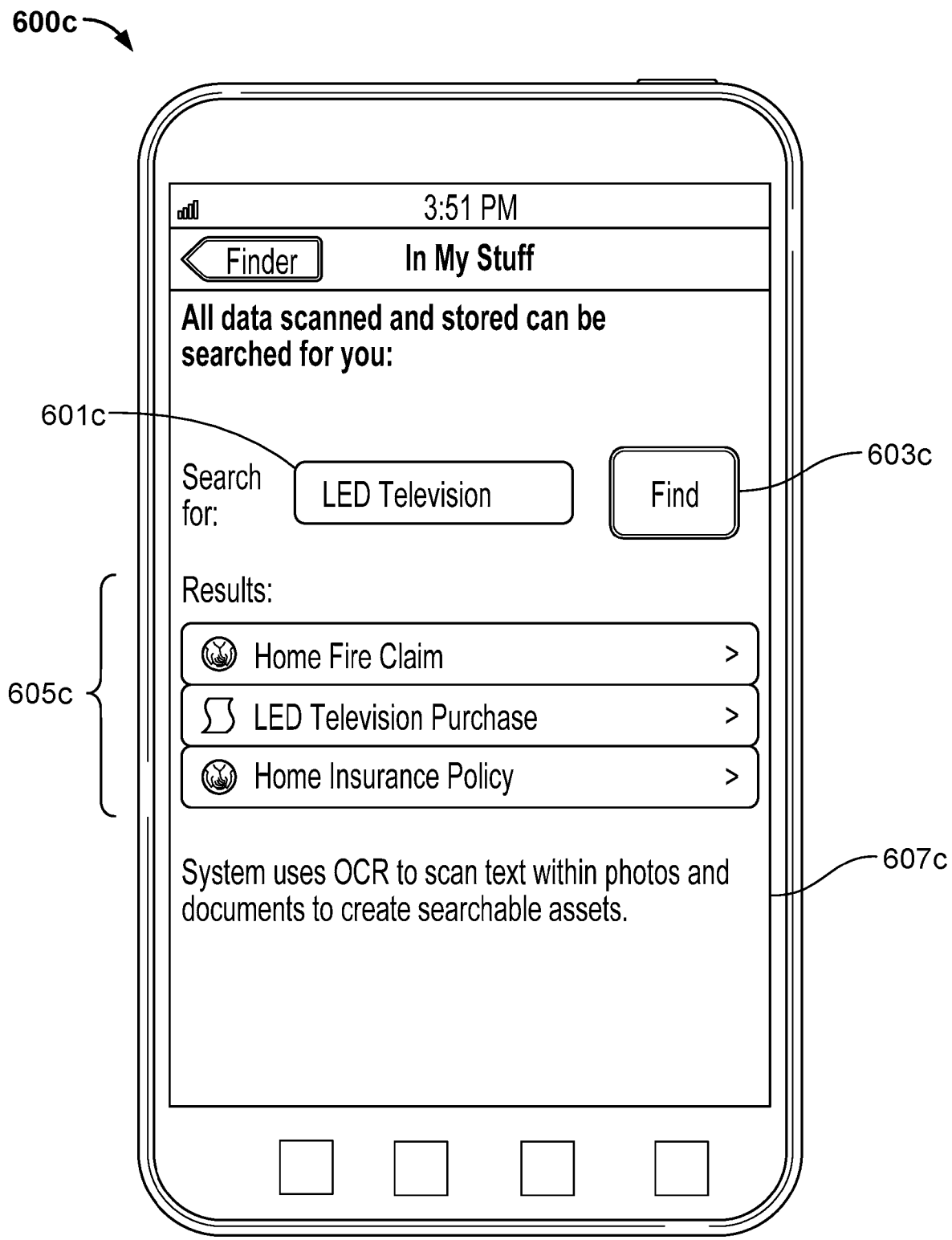
FIG. 6c shows an example display screen for allowing a user to search through an inventory in accordance with certain aspects of the present disclosure.

FIG. 6c shows an example display screen 600c for allowing a user to search through an inventory in accordance with at least one aspect of the present disclosure. Screen 600c may include a search box 601c for entering keywords that should be searched in the inventory. Once the appropriate keywords have been entered into search box 601c, a user may touch the "find" button 603c to have the device displaying screen 600c initiate a keyword search of a given inventory. The device displaying screen 600c may process the keywords in any number of ways. In one example, a processor associated with the device displaying screen 600c may use optical character recognition (OCR) to scan text within photos and documents to create searchable assets, as displayed in region 607c of screen 600c. Once the keywords are processed, screen 600c may display a "results" section 605c that includes various documents, files, and other information that contain one or more instantiations of the keywords entered into search box 601c. It should also be noted that screen 600c may be displayed after a user has entered information (e.g., name of user associated with the inventory, address related to the inventory, etc.) identifying the inventory that should be searched. As an example, consider a scenario where a customer of an insurance company stores inventory information of insured items associated with her home in a database associated with optimized inventory analysis server 101. Assume also that the customer is 35 years old and lives in the home with her husband and two kids. In addition, assume that severe weather causes flooding in the basement of their home and that the basement includes a total loss associated with insured items, including a television, oriental rugs, and a stereo system.

To confirm that the items in the basement are in fact covered by the insurance company, the customer may use her mobile to run a home inventory application for accessing a list of items (similar to the list of items depicted in FIG. 6a) associated with her home's insured inventory. Assume in this case that the home inventory application does indeed confirm that the list of insured items includes a television, oriental rugs, and a stereo system within the basement.

The customer may submit a claim to the insurance company via the Internet for damage to the basement and may include pictures of damage associated with the television, rugs, and stereo system. When optimized inventory analysis server 101 receives this information, server 101 may process the claim by accessing the relevant inventory information associated with the claim. Because the claim indicates that the location of the damage is within the basement of the customer's home, server 101 may determine all of the insured items located in the basement of the customer's home. When server 101 accesses the appropriate inventory within database 201, server 101 may confirm that there are three insured items within the customer's basement - a television set, several oriental rugs, and a stereo system.

Server 101 may then determine a depreciated value of the three items by first determining the original purchase price of the three items. Assume that in this case server 101 determines that the combined depreciated value of the three items is $1000. Assume also that the three items are covered at 100% of assessed damage/loss after a $250 deductible is paid. Server 101 may generate an estimate that includes the assessed loss of $1000 and may also include details of the insurance coverage level for the three items.

Server 101 may transmit this estimate to the customer, who then may review the estimate to determine if she has any questions or concerns. Assume that in this case the customer realized that there was damage to additional items covered by the home insurance policy within the basement. In this case, the customer realized that the refrigerator in the basement was also damaged because of the flood damage. The customer may also search for the keyword "refrigerator" in the home inventory application (e.g., using an interface similar to the interface shown in FIG. 6c) and may realize that the refrigerator is not included in the home inventory.

Upon this realization and in response to the estimate, the customer may transmit information related to this additional damage to the insurance company. In one aspect, the customer may transmit this information to optimized inventory analysis server 101 by running the home inventory application on her mobile phone and adding the basement refrigerator to the inventory of items associated with her home using an interface similar to the interface depicted in FIG. 6b. After adding a new item, the home inventory application may either automatically direct the transmission of information related to the new inventory item to server 101 or the customer may direct transmission of this information via email, SMS, etc.

Server 101 may review the customer's response and determine if the estimate should be amended. Because the customer submitted damage related to additional items, server 101 may access database 201 to determine if the refrigerator in the basement is covered by the insurance policy. Assume in this scenario that server 101 analyzes the home insurance policy for the customer and determines that all items in the basement are covered up to 100% of assessed damage/loss. In view of this determination, server 101 may calculate that the depreciated value of the refrigerator in the basement is $300, making the total depreciated value of the four items $1300. Server 101 may modify the original estimate to reflect these new numbers and transmit the amended estimate back to the customer.

Assume that the customer reviews the modified estimate and determines that it accurately reflects the damage to her basement. In this case, the customer may transmit an acknowledgement that she has no additional concerns with regard to the amended estimate.

Once server 101 receives this acknowledgement, server 101 may generate a finalized settlement for the assessed loss in the form of a check. The check may be in the amount of the total assessed loss (i.e., $1300) minus the deductible (i.e., $250) on the home insurance plan. Thus, a check for $1050 may be direct deposited into the customer's account.

Along with transmitting the settlement, server 101 may also recommend various items that the customer may not already own. For instance, server 101 may determine that the customer in question lacks a home theater system owned by other customers in the 30-40 year old range with two kids and with similarly priced homes (i.e., those customers in the same demographic classification as the customer in question). Thus, along with providing a settlement for damage to the basement, server 101 may transmit a recommendation of a home theater system to the customer in question. Alternatively, server 101 may determine that the customer in question may already own a home theater system (e.g., because other customers within the same demographic classification own such a system) and may transmit a notification to the customer in question, stating that a home theater system may have not been properly entered into the home inventory.

Figure 7:
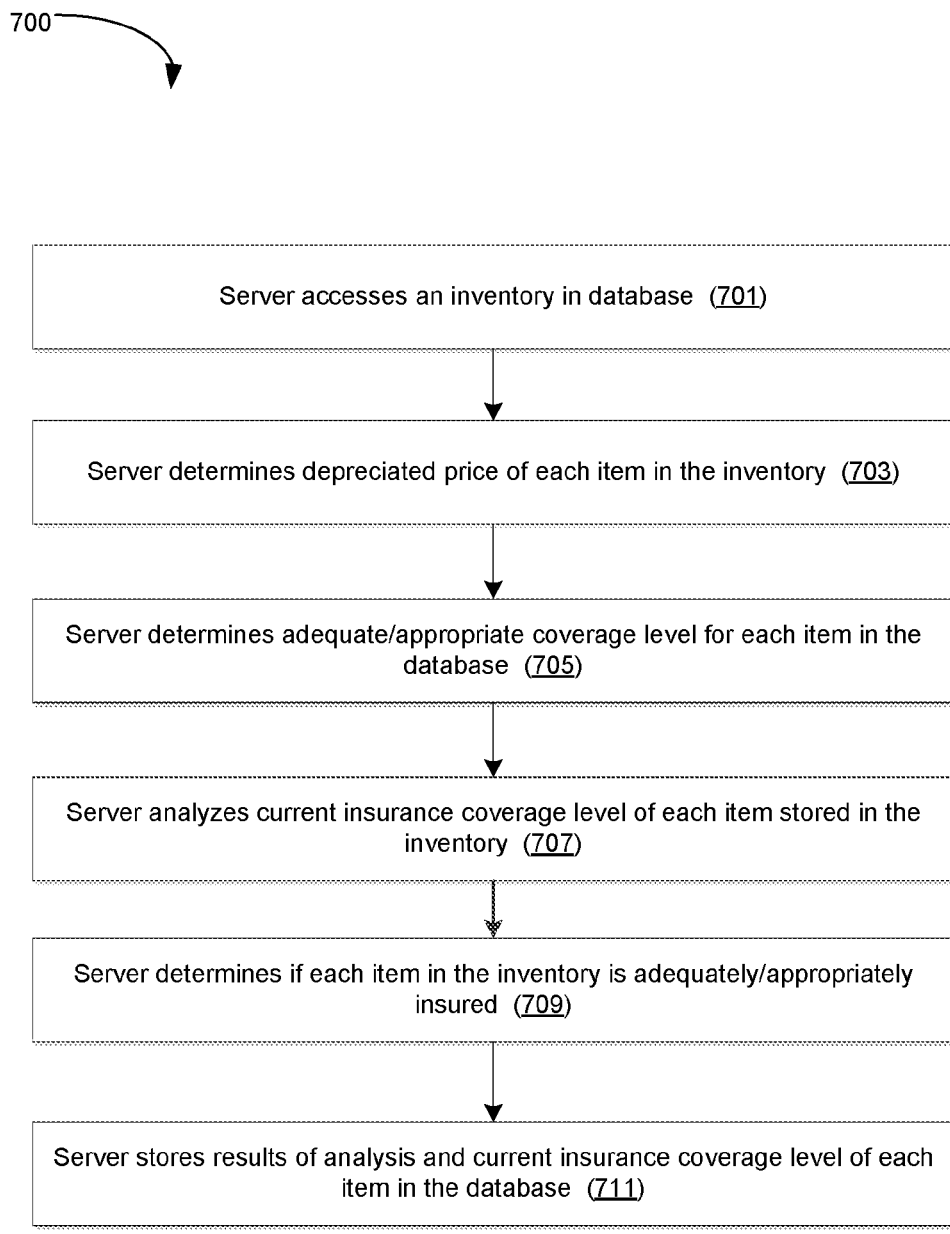
FIG. 7 shows a process flow for determining if items within an inventory are adequately insured in accordance with certain aspects of the present disclosure.

FIG. 7 shows a process flow for determining if items within an inventory are adequately insured in accordance with at least one aspect of the present disclosure. The process 700 may start out at step 701 where optimized inventory analysis server 101 may access an inventory stored in a database (e.g., database 201). The process may then move to step 703 where server 101 may determine a depreciated price of each item in the inventory by, for instance, using the methodology shown in FIG. 4.

After the value of each of the items is determined, server 101 may use this information to determine an adequate/appropriate insurance coverage level for each item in step 705. Server 101 may determine adequate coverage levels in a variety of ways. For instance, server 101 may refer to statistical tables maintained by an entity managing server 101 (e.g., an insurance company). In additional embodiments, server 101 may interface with external servers that include risk and loss associated with various items. In some embodiments, the depreciated value of an item may impact whether an item is deemed to have adequate insurance coverage.

Once adequate/appropriate coverage levels are determined, the process may move to step 707 where optimized inventory analysis server 101 may analyze the current insurance coverage level of each item within the inventory (e.g., based on terms as stated in a homeowner's, automobile, etc. insurance policy). This information may be stored in database 201 as part of the inventory information for a given user. The process may then move to step 709 where server 101 may compare the adequate insurance coverage level for each item as determined in step 705 with the current insurance coverage level for each item as analyzed in step 707 to determine if each item in the inventory is adequately insured.

An item may not be adequately and/or appropriately insured for a number of reasons. For instance, an owner of the item may not have wanted to purchase adequate insurance coverage for an item at a given time because of the increased cost. Or, the item may have been over-insured by the owner when the item was first purchased. In this aspect, once optimized inventory analysis server 101 detects that a given item is over-insured, server 101 may then calculate a cost-savings for an owner of the item by decreasing the coverage to an adequate coverage level. Over time, the owner's needs may have changed and/or the item itself may have changed in value to the point where previous insurance coverage levels are no longer appropriate. In this regard, an insurance coverage level may refer to various aspects of an insurance policy, including the premium level, deductible level, and amount of compensation for assessed loss/damage.

Once server 101 determines if each item within an inventory is adequately insured, the process may move to step 711 where server 101 may store results of this analysis and the current coverage levels for each item in database 201. This information may then be used for other processes, as discussed below.

In some aspects, optimized inventory analysis server 101 may provide insurance quotes (e.g., for a new insurance policy) for prospective customers (e.g., of an insurance company). In this aspect, server 101 may direct a prospective customer to take photographs of items owned by the prospect (e.g., in a home, office, etc.). The prospect may then transmit item information to optimized inventory analysis server 101. Server 101 may analyze this information to determine a customized insurance policy (e.g., with a predetermined premium level, coverage level, etc.) for the prospect. The details of this customized insurance policy may then be transmitted to the prospective customer for review and approval.

Figure 8:
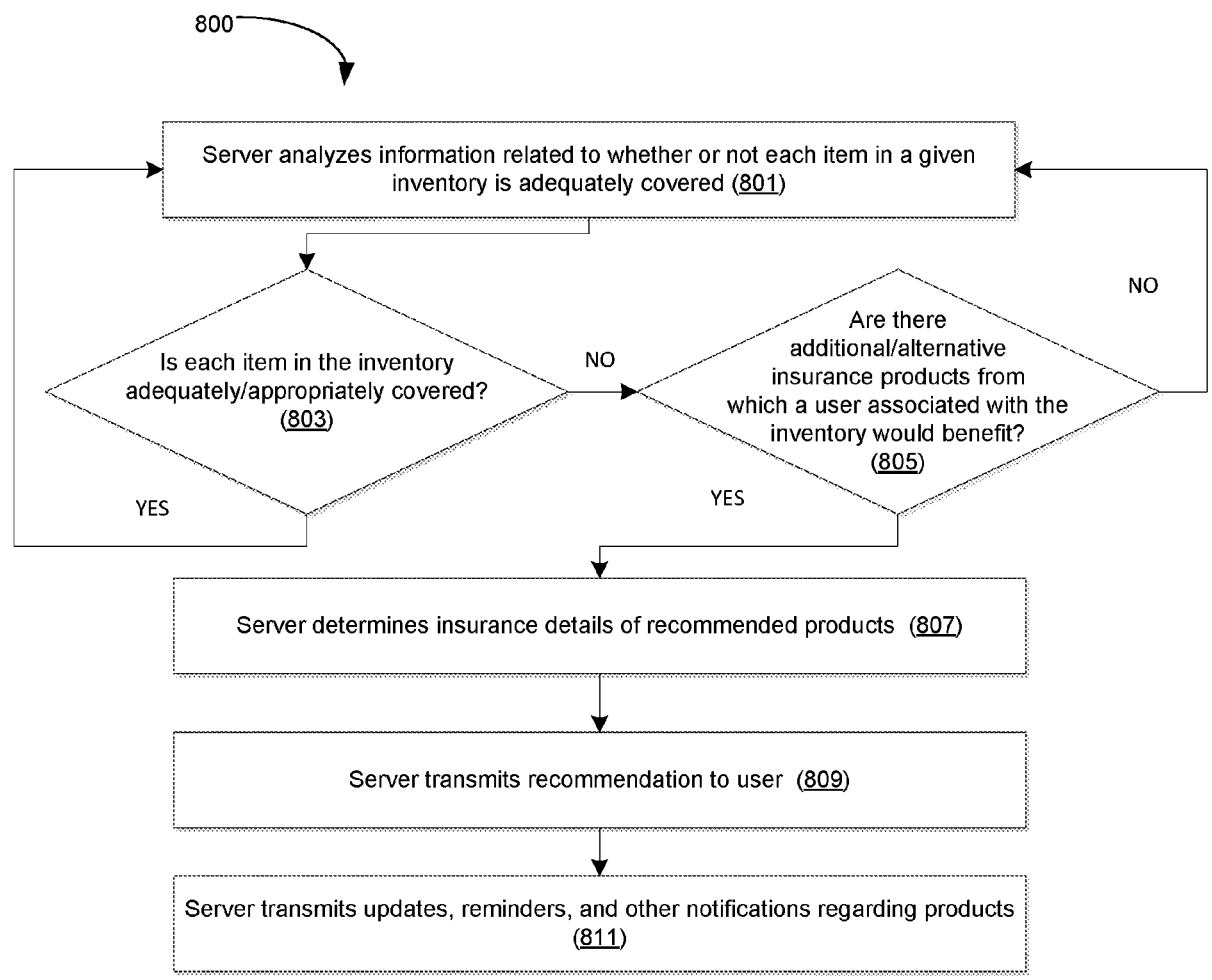
FIG. 8 shows a process flow for recommending insurance products based upon a determination of whether or not inventory items are adequately covered, in accordance with certain aspects of the present disclosure.

FIG. 8 shows a process flow for recommending insurance products based upon a determination of whether or not inventory items are adequately covered, in accordance with at least one aspect of the present disclosure. The process 800 may start at step 801 where optimized inventory analysis server 101 may analyze information related to whether or not each item in a given inventory is adequately covered by an insurance policy. This information may have been generated by processes such as those described in FIG. 7. The process may then move to step 803 where server 101 may determine if each item in the inventory is adequately/appropriately covered by an existing insurance policy. If each item in the inventory is adequately/appropriately covered by an existing insurance policy, the process may move back to step 801 where server 101 may analyze information related to another inventory. If each item in the inventory is not adequately/appropriately covered by an existing insurance policy, the process may move to step 805 where server 101 may determine if there are additional and/or alternative insurance products (e.g., missing insurance policies, more appropriate insurance policies, etc.) offered by an entity managing server 101 (e.g., an insurance company) from which a user associated with the inventory of items would benefit. For instance, the user may not have purchased adequate coverage associated with a prized painting in his home because he did not appreciate the value of the painting at the time of purchase. Or, the user may have recently purchased a new television set which has yet to be covered under an existing insurance policy. Alternatively, the user may have over-insured an item and server 101 may recommend insurance products that are less extensive. Regardless of the reason why an item may not be adequately and/or appropriately covered, once server 101 determines that there are additional insurance products for recommendation, the process may move to step 807 where server 101 may determine the insurance details such as deductibles, premium levels, coverage levels, etc. associated with those products. Alternatively, if server 101 determines that there are no additional insurance products offered by the insurance company from which the user would benefit, the process may move back to step 801 where server 101 may analyze information associated with another inventory.

When server 101 determines insurance products for recommendation and associated details, the process may move to step 809 where server 101 may transmit the product recommendation and associated details to a user associated with the inventory. Server 101 may transmit the recommendation in many different ways, including via SMS, email, postal mail, telephone, etc. In addition, users may use various types of user devices (e.g., personal computers, laptops, mobile phones, etc.) to receive these messages and alerts. Users may also control which messages and alerts are delivered to user devices by manipulating settings within applications running on the user devices. For instance, users may turn certain alerts off or control how alerts are received (e.g., via email versus regular mail).

The user may then consider the recommended products and may or may not decide to purchase the additional insurance products. In step 811, server 101 may also periodically transmit updates (e.g., as push notifications) and reminders regarding various insurance products to the user. For instance, server 101 may transmit reminders regarding upcoming renewal dates for existing insurance products or information regarding new products offered by the entity managing server 101.

As an example, consider a scenario where a homeowner's inventory includes three items: a television set, an exercise machine, and an antique chair. Assume also that the depreciated value of the television set is $1000, the depreciated value of the exercise machine is $300, and the depreciated value of the antique chair is $1200. In this scenario, assume that the television set is currently insured at 100% of assessed damage/loss (0 deductible), the exercise machine is currently insured up to $300 worth of assessed damage/loss (0 deductible), and the antique chair is currently insured up to $500 worth of assessed damage/loss (0 deductible). Assume also that optimized inventory analysis server 101 determines that an adequate coverage level for the television set and antique chair is full cost of assessed damage/loss and that an adequate coverage level for the exercise machine is up to $300 of assessed damage/loss.

In this scenario, when server 101 analyzes the current insurance coverage levels with the levels that are deemed appropriate for the three items, server 101 may determine that the television set and the exercise machine are adequately covered. However, server 101 may also determine that the antique chair is inadequately covered.

Server 101 may determine that an insurance policy that provides full coverage (e.g., of assessed damage/loss) would be appropriate for the television set and the antique chair and that the $300 coverage level would be appropriate for the exercise machine. Therefore, server 101 may recommend that the insurance coverage level for the antique chair be increased from $500 worth of assessed damage/loss to full cost of assessed damage/loss.

Server 101 may transmit this recommendation to the appropriate policyholder via an alert message to the policyholder's mobile phone. Upon review, the policyholder may review the recommendation and either accept or decline the recommendation via a return message to server 101. Assume that in this case the policyholder accepts the recommended insurance coverage. Server 101 may then process the request, allow the policyholder to purchase the recommended coverage, and once purchased, may add the recommended coverage to the policyholder's existing plan. Server 101 may also send the policyholder future messages about upcoming renewal dates for existing policies and notifications about new products offered by the entity that is managing server 101 (e.g., an insurance company).

Figure 9:
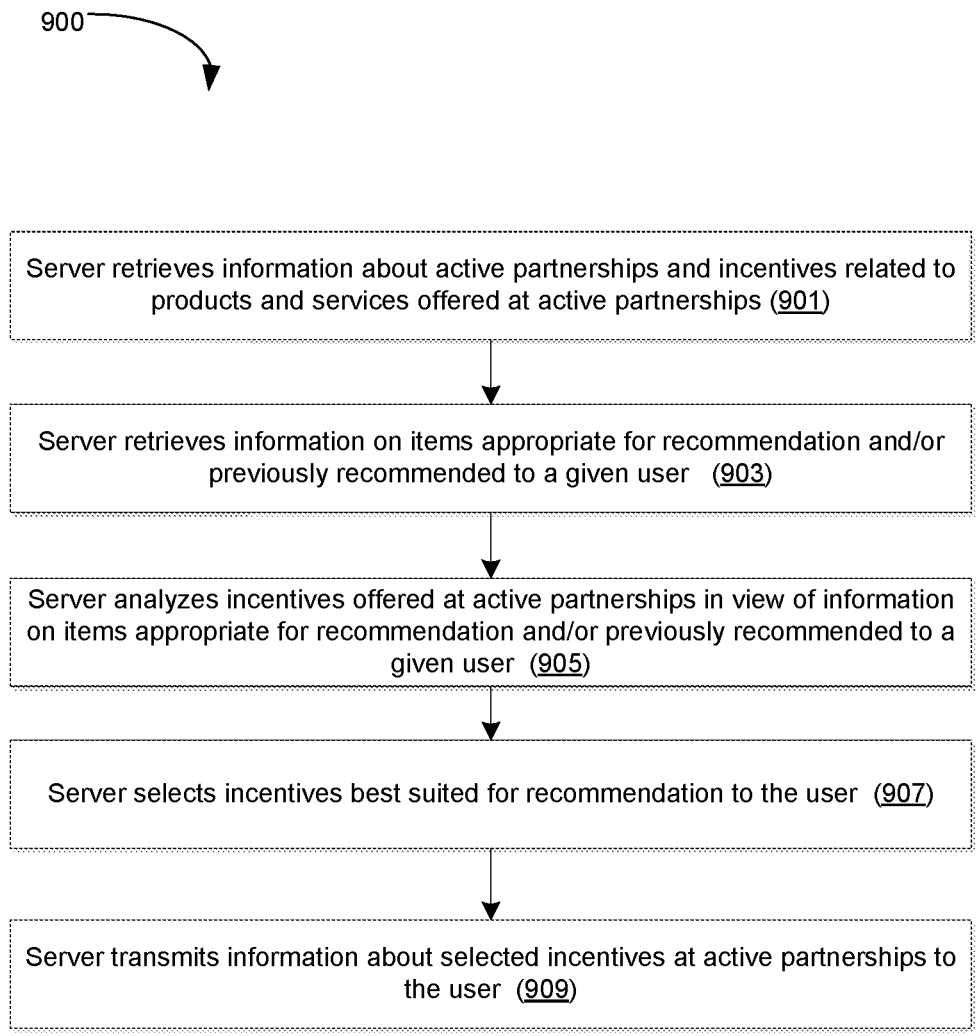
FIG. 9 shows a process flow for recommending incentives on products/services offered by third party entities, in accordance with certain aspects of the present disclosure.

FIG. 9 shows a process flow for recommending incentives on products/services offered by third party entities, in accordance with at least one aspect of the present disclosure. The process 900 may start out at step 901 where optimized inventory analysis server 101 may retrieve information (e.g., from database 201) about active partnerships of an entity (e.g., an insurance company) that is managing server 101 and incentives related to products and services offered at these active partnerships.

Active partnerships may represent those partnerships (e.g., business relationships) that are not expired and/or otherwise nullified; in other words, active partnerships may represent partnerships that are currently in force, such as through an agreement, contract, etc. The entity that is managing server 101 may have had partnerships in the past with third party entities which are no longer in effect, but this information may still be stored in database 201; therefore, server 101 may need to analyze all of the information about partnerships stored in database 201 and select only that information that represents active partnerships.

Information about partnerships may have been stored in database 201 when an individual/group associated with the entity managing server 101 entered this information into database 201. In other embodiments, server 101 may have coordinated the storing of this information in an automated way. For instance, partners may transmit data relating to the terms of the partnership, upcoming discounts and other incentives on products/services offered by the partners, etc. to server 101, and server 101 may categorize (e.g., based on the name of the partner, type of discount/incentive offered by the partner, etc.) and store this data into database 201.

In certain aspects of the disclosure, incentives offered by partners may vary widely. For instance, an incentive may represent a discount on a single product/service or a group of products/services offered by a given partner. In other embodiments, an incentive may represent a sweepstakes, rebate, cash reward, free samples, and/or any other offer that may entice users of server 101 to consider the products/services offered by partners of the entity managing server 101.

In certain aspects, partnerships may be developed in a variety of ways. For instance, an insurance company managing server 101 may partner with vendors such as retail stores, repair shops, and/or other establishments to offer additional incentives to users of server 101. These partnerships may benefit both the insurance company and the partner in a variety of ways. For instance, the insurance company may benefit by marketing themselves as a business that provides users of server 101 with discounts and other incentives at third party entities. Partners may benefit by exposure to users that may not have otherwise shopped for products/services offered by the third party entities.

Once information about active partnerships is retrieved, the process may then move to step 903 where server 101 may retrieve information on items appropriate for recommendation and/or previously recommended by server 101 to a given user of server 101 (e.g., an insurance customer). This information may have been determined in a variety of ways, such as by the methodology discussed in FIG. 3.

Once previously recommended items and/or candidate items for recommendation are determined, the process may move to step 905 where optimized inventory analysis server 101 may analyze incentives offered at active partnerships in view of the information on items appropriate for recommendation and/or previously recommended to a given user. In some aspects, server 101 may match candidate items for recommendation and/or items previously recommended to a given user with incentives offered for those items at third party entities. In other words, server 101 may determine which items appropriate for recommendation and/or previously recommended by server 101 are associated with an incentive offered by a third party active partner of the entity managing server 101.

Once server 101 determines which items appropriate for recommendation and/or previously recommended by server 101 are associated with an incentive offered by a third party active partner of the entity managing server 101, the process may move to step 907 where server 101 may select one or more of the incentives associated with these items as best suited for recommendation to the user in question.

Server 101 may choose incentives as best suited for a given user based on one or more factors. For instance, server 101 may choose incentives based on the value (e.g., amount of discount, rebate, and/or cash reward) of the incentive. In other embodiments, server 101 may choose incentives based on the type of agreement and/or contract that undergirds the partnership between the entity managing server 101 and the third party entity. For instance, an agreement between the entity managing server 101 and the third party entity may specify that an incentive offered by a third party entity should always be chosen when an item to which the incentive corresponds appears as a candidate item for recommendation or as an item that has already been recommended to a given user. In yet other embodiments, server 101 may choose incentives as best suited for a given user based on user-provided preferences (e.g., user prefers one retailer over another, etc.). In addition, server 101 may automatically select all of the incentives that correspond to candidate items for recommendation and/or items that have previously been recommended to a given user.

Once optimized inventory analysis server 101 selects the incentives that are best suited for recommendation to a given user, the process may move to step 909 where server 101 may transmit (e.g., via email, SMS, etc.) information about the selected incentives to the user (e.g., for display on a user device).

Once the user receives the recommended incentives, the user may choose to either ignore or take further actions with regard to the recommendation. For instance, the user may request more information about the recommended incentives either from server 101 or from one or more partners offering the incentive. The user may also visit the partners' businesses to decide whether or not to purchase one or more items associated with the recommended incentives.

Figure 10:
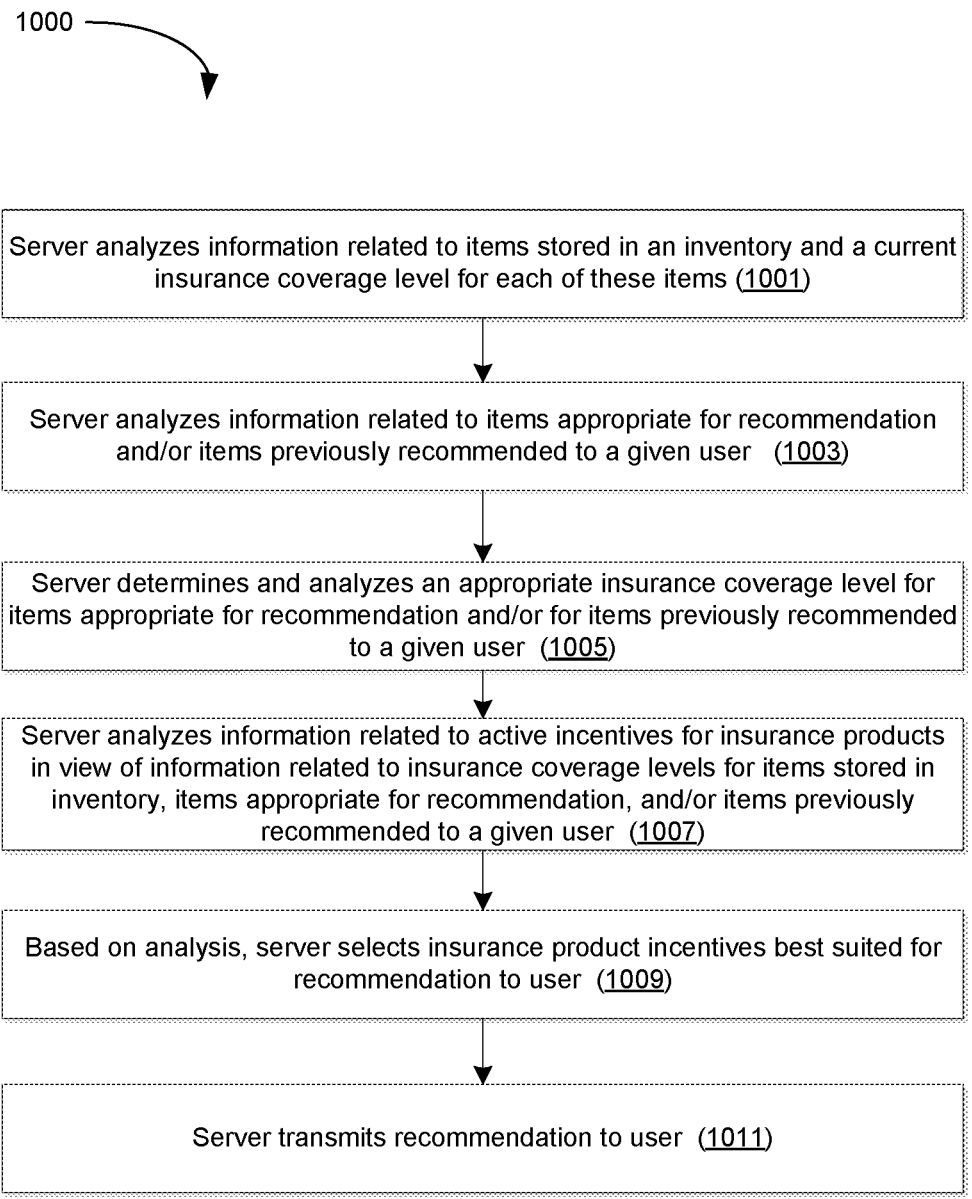
FIG. 10 shows a process flow for recommending incentives on insurance products for insuring products/services sold by third party entities, in accordance with certain aspects of the present disclosure.

FIG. 10 shows a process flow for recommending incentives on insurance products for insuring products/services sold by third party entities, in accordance with at least one aspect of the present disclosure. The process 1000 may start out at step 1001 where optimized inventory analysis server 101 may analyze information related to items stored in an inventory for a given user (e.g., by accessing database 201). Server 101 may also analyze a current insurance coverage level (e.g., premiums, amount of compensation in the event of assessed loss, deductibles, etc.) associated with each of these items.

The process may then move to step 1003 where server 101 may analyze information related to items appropriate for recommendation and/or items previously recommended to a given user. These items may be determined in a variety of ways, such as by the methodology described in FIG. 3.

Next, in step 1005, server 101 may determine an appropriate insurance coverage level for the items analyzed in step 1003. Server 101 may determine appropriate insurance coverage levels in a variety of ways, such as those discussed in relation to the methodology outlined in FIGS. 7 and 8.

Once item information and insurance coverage level information have been analyzed for a given user, the process may move to step 1007 where server 101 may analyze information related to active incentives for insurance products for optimally insuring items that the user already owns, items that server 101 has recommended that the user own, and/or items that server 101 will recommend that the user own. Active incentives may refer to those incentives currently being offered on insurance products associated with (e.g., sold by) the entity managing server 101. For instance, the entity managing server 101 may periodically offer incentives on insurance products to entice current customers to purchase additional/alternative insurance products and/or to entice potential customers to become customers of the entity managing server 101. These incentives may be active for a predetermined length of time, after which they may become inactive (e.g., no longer offered as an incentive).

Based on the analysis in step 1007, the process may move to step 1009 where optimized inventory analysis server 101 may select insurance product incentives that are best suited for recommendation to the user in question. Server 101 may choose insurance product incentives as best suited for a given user based on one or more factors. For instance, server 101 may choose insurance product incentives based on the value (e.g., amount of discount, rebate, and/or cash reward) of the incentive. In other embodiments, optimized inventory analysis server 101 may choose insurance product incentives based on incentives that have been previously identified by users as incentives of interest. For instance, if a user indicates that he/she is interested in discounted products for insuring electronic items in his/her home, server 101 may use this information to recommend future discounts on these types of insurance products to the user.

Finally, once server 101 has selected one or more insurance product incentives for recommendation to a user, the process may move to step 1011 where server 101 may transmit the recommendation to the user.

In some aspects, server 101 may transmit recommendations on insurance product incentives to a given user in conjunction with other types of recommendations, such as those related to items that the user may want to own, insurance products that the user may want to purchase, and incentives on items of interest sold by third party entities.

As an example, consider a scenario where an insurance company insures various electronics goods (e.g., television, stereo system, computer, etc.) located within the home of a customer. Assume also that the customer has indicated an interest in purchasing a new television set for his living room. Assume also that the insurance company partners with various third party retailers, such as those that sell clothes, sporting gear, and electronics, to offer incentives on purchases at the third party retailers.

When optimized inventory analysis server 101 associated with the insurance company becomes aware of a new promotion for 50% off of all merchandise purchased at the local electronics store, server 101 may analyze the customer's preferences, may realize that the customer seeks to purchase a new television set, and may transmit information to the customer about the address of the local electronics store, store timings, and dates during which the promotion will be running.

Assume that in this scenario the customer actually purchases a new television set at the local electronics store. In this case, the partner and/or the customer may transmit information regarding the purchase to the insurance company, and upon receiving this information, optimized inventory analysis server 101 may determine insurance products and active incentives for optimally insuring the new television set. In this process, server 101 may price the television set and determine that an insurance policy offering full coverage for assessed loss to the television, a low deductible, and a low premium would be optimal. Server 101 may also determine that the insurance company is currently running a special program that allows this type of policy to be purchased at 20% less than regular price for current customers. Thus, server 101 may transmit information regarding the recommended insurance policy and the relevant incentive for this insurance policy to the customer in question. The customer may then decide whether or not the recommended policy should be purchased.

The foregoing descriptions of the disclosure have been presented for purposes of illustration and description. They are not exhaustive and do not limit the disclosure to the precise form disclosed. Modifications and variations are possible in light of the above teachings or may be acquired from practicing of the disclosure. For example, the described implementation includes software but the present disclosure may be implemented as a combination of hardware and software or in hardware alone. Additionally, although aspects of the present disclosure are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

What is claimed is:

1. A non-transitory computer-readable storage medium having computer-executable program instructions stored thereon that, when executed by a processor of an inventory analysis server, cause the processor to:
   receive, via a network connection and from at least one user device associated with a user account, an image of a room of a building;
   analyze, by executing image processing, the image to determine a set of items in the room, the set of items comprising a first item, wherein the image processing comprises at least one image processing technique selected from the group consisting of blur filters, grey-scaling, optical recognition, edge detection, and comparison to similar items stored in a first database of the inventory analysis, and combinations thereof;
   determine, based on the executed image processing, metadata associated with the first item;
   store, in a first database of the inventory analysis server and in association with an inventory that indicates a plurality of items associated with the building:
      data indicating the determined set of items,
      data indicating in which room of the building the set of items are located,
      metadata associated with the set of items, and
      a user profile associated with the set of items;
   transmit, a first request for purchase price data of the first item and purchase date data of the first item;
   receive first information indicating a date the first item was purchased;
   determine that the purchase price data of the first item is not available;
   automatically determine, in response to the determination that the purchase price data of the first item is not available, a second item based at least on a portion of the first information;
   retrieve, via a network and from at least one second database that is external to the inventory analysis server, a current price of the second item;
   calculate a first depreciated value of the first item based on the current price of the second item and the first information;
   store, in the first database and in association with the first item of the inventory, the calculated first depreciated value of the first item;
   based on the user profile, classify the user into at least one demographic;
   determine a third item owned by a majority of users associated with the at least one demographic;
   determine that the third item is not stored in the first database; and
   transmit, to the at least one user device, an incentive to purchase the third item; and
   complete the following, for each item of the set of items in the inventory separately from one another:
      determine an appropriate insurance coverage level for an item;
      analyze a current insurance coverage level of the item;
      determine that the item is not adequately insured by determining that the current insurance coverage level is less than the appropriate insurance coverage level; and
      transmit, to the user, a recommendation that the current insurance coverage level of the item be increased.

2. The non-transitory computer-readable storage medium of claim 1, wherein the computer-executable program instructions further cause the processor to:
   receive depreciation information regarding prior damage of the first item, wherein the prior damage comprises damage that occurred prior to the first item being added to the inventory, and calculate the first depreciated value of the first item further based on the depreciation information.

3. The non-transitory computer-readable storage medium of claim 1, wherein the first request for the purchase price data of the first item and the purchase date data of the first item is transmitted to the at least one user device.

4. The non-transitory computer-readable storage medium of claim 1,
   wherein the first request for the purchase price data of the first item and the purchase date data of the first item is transmitted to one or more databases remote from the inventory analysis server and associated with one or more entities that sell the first item, and
   wherein the one or more databases are different from the at least one user device.

5. The non-transitory computer-readable storage medium of claim 1, wherein the computer-executable program instructions further cause the processor to:
   receive, via the network connection and from the at least one user device, text data regarding a third item to be added to the inventory;
   transmit a second request, to the at least one user device, and in response to receiving the text data, for purchase price data of the third item and a date the third item was purchased;
   receive, from the at least one user device, second information indicating the purchase price data of the third item and the purchase date data of the third item;
   in response to receiving the second information indicating the purchase price data of the third item and the purchase date data of the third item, calculate a second depreciated value of the third item based on the purchase price data of the third item and the purchase date data of the third item; and
   store, in the first database and in association with the third item, the calculated second depreciated value of the third item.

6. The non-transitory computer-readable storage medium of claim 5, wherein the computer-executable program instructions further cause the processor to:
   receive, via the network connection and from the at least one user device, an email or a short message system (SMS) text message; and
   extract the text data from the email or the SMS text message.

7. The non-transitory computer-readable storage medium of claim 1, wherein the computer-executable program instructions further cause the processor to:
  receive, from a remote computer of a business, information that a fourth item was purchased from the business by a user associated with the building; and
  store, in the first database, identification data to associate the fourth item with the inventory, the identification data identifying the fourth item.

8. The non-transitory computer-readable storage medium of claim 1, wherein the computer-executable program instructions further cause the processor to:
  receive an audio file regarding a fourth item to be added to the inventory stored in the first database;
  analyze, using a speech processing technique, the audio file to generate information regarding the fourth item; and
  store the information regarding the fourth item in the first database in association with the inventory.

9. The non-transitory computer-readable storage medium of claim 1,
  wherein the portion of the first information for the first item comprises a model number of the first item,
  wherein calculating the first depreciated value of the first item based on the current price of the second item comprises adjusting the current price of the second item based on a difference between the second item and the first item and calculating the first depreciated value of the first item based on the adjusted current price of the second item.

10. A system, comprising:
  at least one user device, comprising at least one first processor executing a home inventory application and first memory, configured to transmit an image of a room of a building; and
  an inventory analysis server, wherein the inventory analysis server comprises second memory and a second processor and is configured to:
    receive, via a network connection and from the at least one user device, the image of the room of the building;
    analyze, by executing image processing, the image to determine a set of items in the room, the set of items comprising a first item, wherein the image processing comprises at least one image processing technique selected from the group consisting of blur filters, grey-scaling, optical recognition, edge detection, and comparison to similar items stored in a first database of the inventory analysis, and combinations thereof;
    determine, based on the executed image processing, metadata associated with the first item;
    store, in a first database of the inventory analysis server and in association with an inventory that indicates a plurality of items associated with the building:
      data indicating the determined set of items,
      data indicating in which room of the building the set of items are located,
      metadata associated with the set of items, and
      a user profile associated with the set of items;
    transmit, a first request for purchase price data of the first item and purchase date data of the first item;
    receive first information indicating a date the first item was purchased;
    determine that the purchase price data of the first item is not available;
    automatically determine, in response to the determination that the purchase price data of the first item is not available, a second item based at least on a portion of the first information;
    retrieve, via a network and from at least one second database that is external to the inventory analysis server, a current price of the second item;
    calculate a first depreciated value of the first item based on the current price of the second item and the first information;
    store, in the first database and in association with the first item of the inventory, the calculated first depreciated value of the first item;
    based on the user profile, predict at least one demographic of the user;
    determine a third item owned by a majority of users associated with the at least one demographic;
    determine that the third item is not stored in the first database; and
    recommend, to the user, that the third item be added to the first database; and
    completing the following, for each item of the set of items in the inventory separately from one another:
      determine an appropriate insurance coverage level for an item;
      analyze a current insurance coverage level of the item;
      determine that the item is not adequately insured by determining that the current insurance coverage level is less than the appropriate insurance coverage level; and
      recommend, to the user, that the current insurance coverage level of the item be increased.

11. The system of claim 10,
  wherein the inventory analysis server is further configured to interface with one or more databases of one or more entities different from a manager of the inventory analysis server, and
  wherein the first request for the purchase price data of the first item and the purchase date data of the first item is transmitted to a particular database associated with a particular entity that sells the first item, wherein the particular entity is one of the one or more entities different from the manager of the inventory analysis server.

12. The system of claim 10, wherein the inventory analysis server is further configured to:
  receive, via the network connection and from the at least one user device, text data regarding a third item to be added to the inventory;
  transmit a second request, to the at least one user device, and in response to receiving the text data, for purchase price data of the third item and a date the third item was purchased;
  receive, from the at least one user device, second information indicating the purchase price data of the third item and the purchase date data of the third item;
  in response to receiving the second information indicating the purchase price data of the third item and the purchase date data of the third item, calculate a second depreciated value of the third item based on the purchase price data of the third item and the purchase date data of the third item; and
  store, in the first database and in association with the third item, the calculated second depreciated value of the third item.

13. The system of claim 12, wherein the inventory analysis server is further configured to:
  receive, via the network connection and from the at least one user device, an email or a short message system (SMS) text message; and
  extract the text data from the email or the SMS text message.

14. The system of claim 10, wherein the inventory analysis server is further configured to:
- receive, from a remote computer of a business, information that a fourth item was purchased from the business by a user associated with the building; and
- store, in the first database, identification data to associate the fourth item with the inventory, the identification data identifying the fourth item.

15. A method, comprising:
- receiving, by a computing device and via a network connection and from at least one user device associated with a user account, an image of a room of a building;
- analyzing, by executing image processing, the image to determine a set of items in the room, the set of items comprising a first item, wherein the image processing comprises at least one image processing technique selected from the group consisting of blur filters, grey-scaling, optical recognition, edge detection, and comparison to similar items stored in a first database of the inventory analysis, and combinations thereof;
- determining, based on the executed image processing, metadata associated with the first item;
- storing, in a first database and in association with an inventory that indicates a plurality of items associated with the building:
  - data indicating the determined set of items in the room,
  - data indicating in which room of the building the set of items are located,
  - metadata associated with the set of items, and
  - a user profile associated with the set of items;
- transmitting, a first request for purchase price data of the first item and purchase date data of the first item;
- receiving first information indicating a date the first item was purchased;
- determining that the purchase price data of the first item is not available;
- automatically determining, in response to the determination that the purchase price data of the first item is not available, a second item based at least on a portion of the first information;
- retrieving, via a network and from at least one second database, a current price of the second item;
- calculating a first depreciated value of the first item based on the current price of the second item and the first information;
- storing, in the first database and in association with the first item of the inventory, the calculated first depreciated value of the first item;
- based on the user profile, classifying the user into at least one demographic;
- determining a third item owned by a majority of users associated with the at least one demographic;
- determining that the third item is not stored in the first database; and
- transmitting, to the user, a recommendation that the third item be added to the first database; and
- completing the following, for each item of the set of items in the inventory separately from one another:
  - determining an appropriate insurance coverage level for an item;
  - analyzing a current insurance coverage level of the item;
  - determining that the item is not adequately insured by determining that the current insurance coverage level is less than the appropriate insurance coverage level; and
  - transmitting, to the user, a recommendation that the current insurance coverage level of the item be increased.

16. The method of claim 15,
wherein the first request for the purchase price data of the first item and the purchase date data of the first item is transmitted to one or more databases remote from the computing device and associated with one or more entities that sell the first item, and
wherein the one or more databases are different from the at least one user device.

17. The method of claim 15, the method further comprising:
- receiving, via the network connection and from the at least one user device, text data regarding a third item to be added to the inventory;
- transmitting a second request, to the at least one user device, and in response to receiving the text data, for purchase price data of the third item and purchase date data of the third item;
- receiving, from the at least one user device, second information indicating the purchase price data of the third item and the purchase date data of the third item;
- in response to receiving the second information indicating the purchase price data of the third item and the purchase date data of the third item, calculating a second depreciated value of the third item based on the purchase price data of the third item and the purchase date data of the third item; and
- storing, in the first database and in association with the third item, the calculated second depreciated value of the third item.

18. The method of claim 15, the method further comprising:
- receiving, from a remote computer of a business, information that a fourth item was purchased from the business by a user associated with the building; and
- storing, in the first database, identification data to associate the fourth item with the inventory, the identification data identifying the fourth item.

* * * * *